United States Patent
Liu et al.

(10) Patent No.: US 11,632,499 B2
(45) Date of Patent: Apr. 18, 2023

(54) MULTI-CAMERA POSITIONING AND DISPATCHING SYSTEM, AND METHOD THEREOF

(71) Applicant: Industrial Technology Research Institute, Hsinchu (TW)

(72) Inventors: Li-Yi Liu, Taipei (TW); Po-Yu Huang, Yunlin County (TW); Wei-Kang Liang, Kaohsiung (TW); Song-Lin Li, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/197,416

(22) Filed: Mar. 10, 2021

(65) Prior Publication Data

US 2022/0150406 A1 May 12, 2022

(30) Foreign Application Priority Data

Nov. 6, 2020 (TW) ................................ 109138788

(51) Int. Cl.
*H04N 5/232* (2006.01)
*G06T 7/80* (2017.01)
(Continued)

(52) U.S. Cl.
CPC ....... *H04N 5/23238* (2013.01); *G01C 21/206* (2013.01); *G06K 9/6217* (2013.01);
(Continued)

(58) Field of Classification Search
CPC .... H04N 5/23238; H04N 5/247; G06V 20/52; G06T 2207/30232; G06T 7/80;
(Continued)

(56) References Cited

U.S. PATENT DOCUMENTS

| 9,906,769 B1* | 2/2018 | Young | H04N 5/247 |
| 10,133,933 B1* | 11/2018 | Fisher | H04N 5/247 |

(Continued)

FOREIGN PATENT DOCUMENTS

| CN | 107808272 A | 3/2018 |
| CN | 106485937 B | 12/2018 |

(Continued)

OTHER PUBLICATIONS

Redmon et al. "You only look once: Unified, real-time object detection" https://www.cv-foundation.org/openaccess/content_cvpr_2016/html/Redmon_You_Only_Look_CVPR_2016_paper.html, The IEEE Conference on Computer Vision and Pattern Recognition (CVPR), 2016, pp. 779-788.

(Continued)

*Primary Examiner* — Boubacar Abdou Tchoussou
(74) *Attorney, Agent, or Firm* — WPAT, PC

(57) ABSTRACT

A multi-camera positioning and dispatching system includes a plurality of cameras and processing device. The cameras are disturbed over an indoor space having a plurality of areas; the cameras are corresponding to the areas and capture the images of the areas respectively. The processing device converts the pixel coordinates of the image of the camera corresponding to each area into the camera coordinates of the area, and converts the cameras coordinates of the area into the world coordinates of the area so as to integrate the images with one another and obtain a panoramic map, defined by a world coordinate system, of the indoor space. The processing device projects the working unit in the image captured by any one of the cameras to the panoramic map. The system can achieve positioning function via the panoramic map so as to optimize indoor environment management and save manpower.

17 Claims, 20 Drawing Sheets

(51) Int. Cl.
*G06T 11/00* (2006.01)
*G06T 7/70* (2017.01)
*G06K 9/62* (2022.01)
*G06Q 10/06* (2012.01)
*G06Q 50/28* (2012.01)
*G06N 3/08* (2006.01)
*G01C 21/20* (2006.01)
*H04N 5/247* (2006.01)
*G06V 20/52* (2022.01)
*G06N 3/04* (2006.01)
*G06Q 10/0631* (2023.01)

(52) U.S. Cl.
CPC ......... *G06N 3/08* (2013.01); *G06Q 10/06315* (2013.01); *G06Q 50/28* (2013.01); *G06T 7/70* (2017.01); *G06T 7/80* (2017.01); *G06T 11/00* (2013.01); *G06V 20/52* (2022.01); *H04N 5/23299* (2018.08); *H04N 5/247* (2013.01); *G06N 3/04* (2013.01); *G06T 2207/20084* (2013.01); *G06T 2207/30232* (2013.01); *G06T 2207/30244* (2013.01); *G06T 2210/12* (2013.01)

(58) Field of Classification Search
CPC ........ G06T 2207/20084; G01C 21/206; G06Q 50/28; G06Q 10/06315; G06K 9/6217; G06N 3/08
See application file for complete search history.

(56) References Cited

U.S. PATENT DOCUMENTS

| | | | |
|---|---|---|---|
| 10,359,783 B2 | 7/2019 | Williams et al. | |
| 10,589,931 B2 | 3/2020 | Jarvis et al. | |
| 2007/0150097 A1 | 6/2007 | Chae et al. | |
| 2019/0265722 A1 | 8/2019 | Haeusler et al. | |
| 2020/0265609 A1* | 8/2020 | Lee | H04N 5/265 |
| 2021/0398237 A1* | 12/2021 | Wan | B65G 1/0492 |
| 2021/0409648 A1* | 12/2021 | Kallakuri | G06T 7/70 |
| 2022/0026221 A1* | 1/2022 | Tian | G01C 21/3446 |
| 2022/0148314 A1* | 5/2022 | Ong | G06V 20/647 |

FOREIGN PATENT DOCUMENTS

| | | |
|---|---|---|
| CN | 110458879 A | 11/2019 |
| CN | 111783849 A | 10/2020 |
| CN | 111860651 A | 10/2020 |
| TW | 201814658 | 4/2018 |
| TW | I622003 | 4/2018 |
| TW | I668644 | 8/2019 |
| TW | 202020693 A | 6/2020 |

OTHER PUBLICATIONS

Volodymyr, et al. "Playing Atari with Deep Reinforcement Learning" https://arxiv.org/abs/1312.5602, arXiv preprint arXiv:1312.5602 (2013).

Vinyals et al. "Pointer Network" shttps://research.google/pubs/pub45283/, Oriol Meire Fortunato Navdeep Jaitly, NIPS (2015), pp. 2692-2700.

TW OA dated Dec. 17, 2021.

* cited by examiner

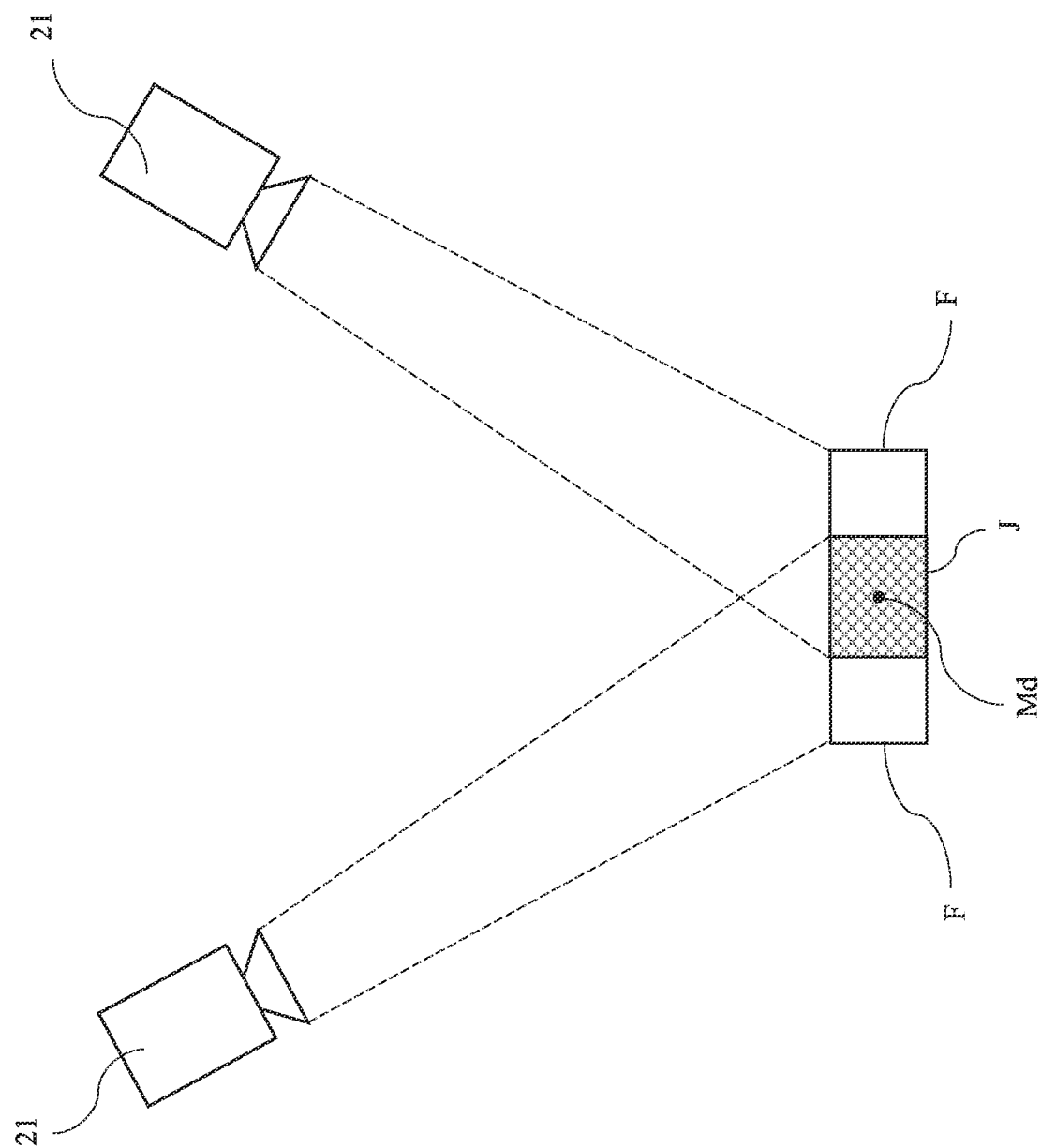

MULTI-CAMERA POSITIONING AND DISPATCHING SYSTEM, AND METHOD THEREOF

CROSS REFERENCE TO RELATED APPLICATION

All related applications are incorporated by reference. The present application is based on, and claims priority from, Taiwan Application Serial Number 109138788, filed on Nov. 6, 2020, the disclosure of which is hereby incorporated by reference herein in its entirety.

TECHNICAL FIELD

The disclosure relates to a multi-camera positioning and dispatching system and the method thereof.

BACKGROUND

Nowadays, e-commerce platforms are one of the major shopping channels of most people. In general, the quantity of the items of the products provided by a product supplier is usually large. Thus, when the orders suddenly increase, the efficiency of the warehouse management of the product supplier may be low because of various warehouse problems (e.g., the space of the warehouse is insufficient or the products are stored at wrong positions), which may influence the delivery time and waste a lot of manpower.

Automated guided vehicles can be used to perform repetitive works, so can save a great deal of manpower. However, since there is no method capable of effectively positioning and dispatching workers and automated guided vehicles for now, so cannot effectively solve the above problems.

SUMMARY

An embodiment of the disclosure provides a multi-camera positioning and dispatching system, which includes a plurality of cameras and a processing device. The cameras are distributed over an indoor space having a plurality of areas, wherein the cameras are corresponding to the areas and configured to capture the images of the areas respectively. The processing device converts the pixel coordinates of the image captured by the camera corresponding to each of the areas into camera coordinates of the area, and converts the camera coordinates of the area into the world coordinates of the area according to the relative position relation between the camera and the indoor space. Then, the processing device overlays the images captured by the cameras and obtain the intersections between the images captured by the cameras so as to integrate the images captured by the cameras with one another, whereby the processing device obtains a panoramic map, defined by a world coordinate system, of the indoor space. When the image captured by any one of the cameras includes a working unit, the processing device projects the working unit to the panoramic map according to the pixel coordinate of the working unit in the image captured by the camera.

Another embodiment of the disclosure provides a multi-camera positioning and dispatching method, which includes the following steps: distributing a plurality of cameras over an indoor space having a plurality of areas, wherein the cameras are corresponding to the areas and capture images of the areas respectively; converting the pixel coordinates of the image captured by the camera corresponding to each of the areas into camera coordinates of the area by a processing device; converting the camera coordinates of the area into the world coordinates of the area according to the relative position relation between the camera and the indoor space by the processing device; overlaying the images captured by the cameras and obtaining the intersections between the images captured by the cameras to integrate the images captured by the cameras with one another by the processing device so as to obtain a panoramic map, defined by a world coordinate system, of the indoor space; and projecting, when the image captured by any one of the cameras includes a working unit, the working unit to the panoramic map according to the pixel coordinate of the working unit in the image captured by the camera by the processing device.

The aforementioned indoor space is not limited to the internal space of a warehouse, but refers to any indoor spaces, such as offices, houses, factories, hypermarkets, shopping malls, department stores, etc. The multi-camera positioning and dispatching system can be applied to any indoor spaces.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein:

FIG. 11B is a second schematic view of the positioning algorithm of the multi-camera positioning and dispatching system in accordance with the second embodiment of the disclosure.

DETAILED DESCRIPTION

Figure 1:
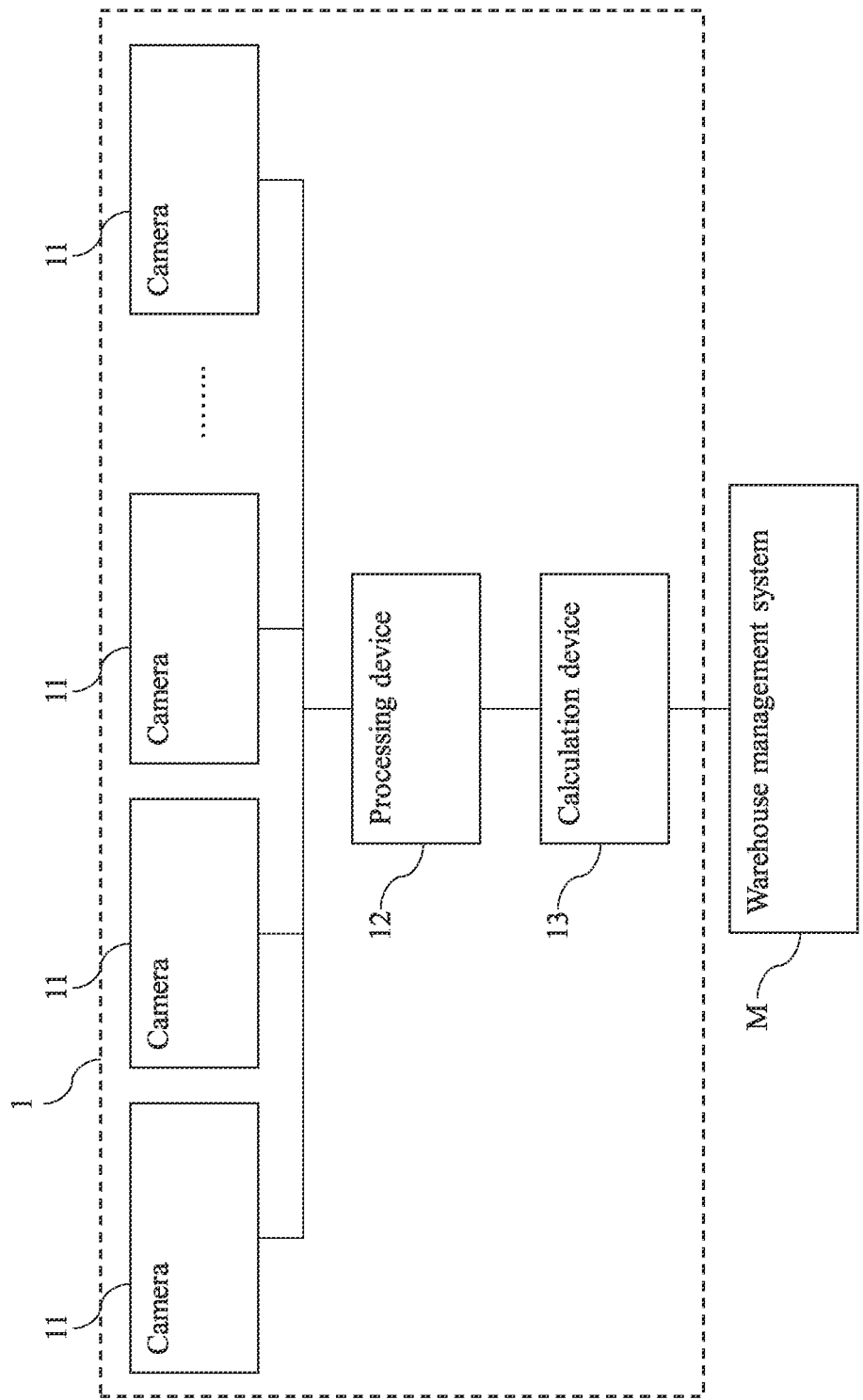
FIG. 1 is a block diagram of a multi-camera positioning and dispatching system in accordance with a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
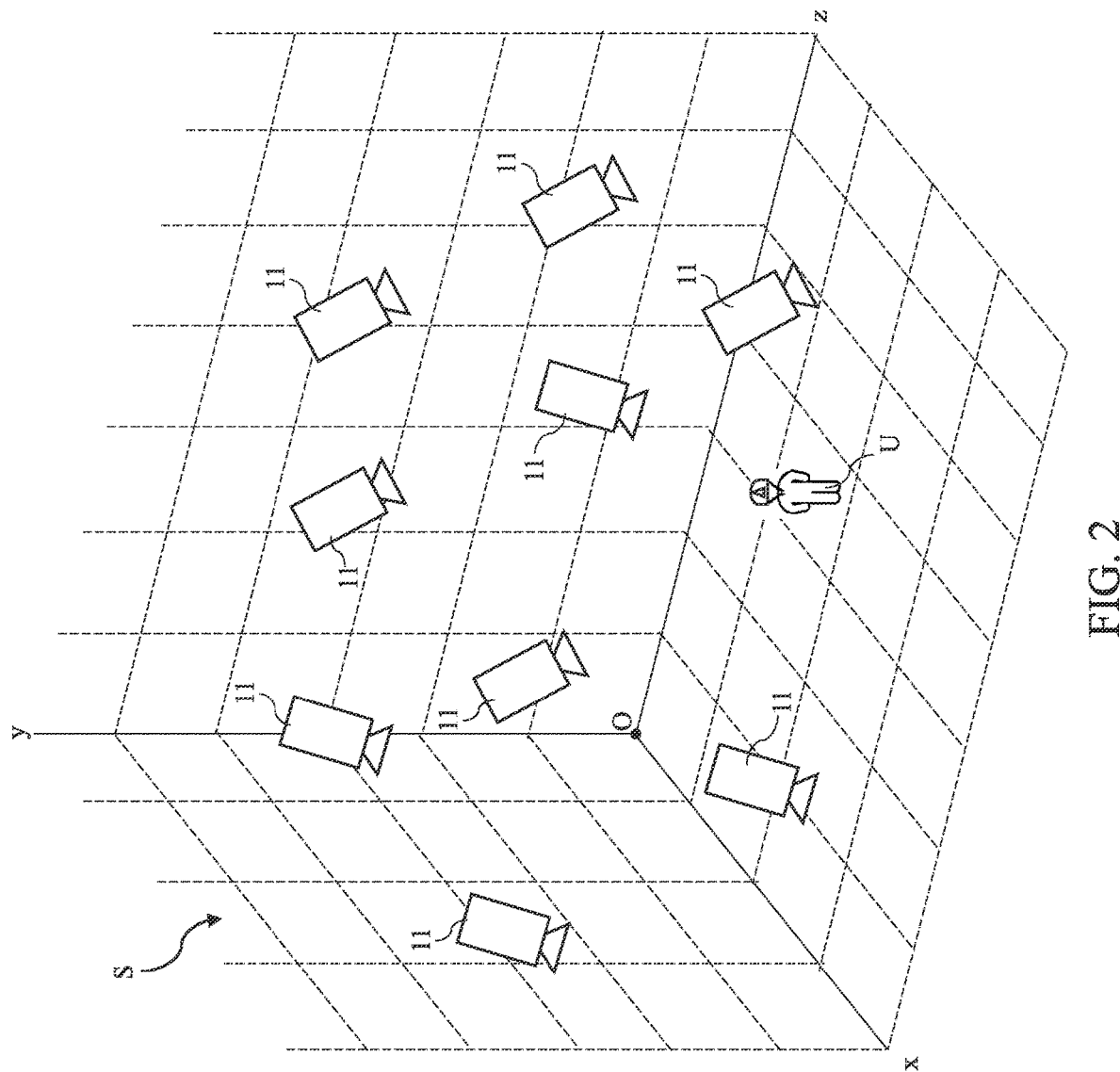
FIG. 2 is a schematic view of the multi-camera positioning and dispatching system in accordance with the first embodiment of the disclosure.

Please refer to FIG. 1 and FIG. 2, which are a block diagram and a schematic view of a multi-camera positioning and dispatching system in accordance with a first embodiment of the disclosure respectively. As shown in FIG. 1 and FIG. 2, the multi-camera positioning and dispatching system 1 includes a plurality of cameras 11, a processing device 12 and a calculation device 13, and is coupled to a warehouse management system M. The cameras 11 are coupled to the processing device 12. The processing device 12 is coupled to the calculation device 13. The calculation device 13 is coupled to the warehouse management system M.

The cameras 11 are distributed over the indoor space S. The indoor space S may be divided into a plurality of areas and the cameras 11 are corresponding to the areas respectively. Each of the areas is defined as the coverage of the image captured by the corresponding camera 11. The cameras 11 are corresponding to the areas of the indoor space S respectively; therefore, the world coordinates of the cameras 11 and relative position relation between each of the cameras 11 and the indoor space S are known. The aforementioned indoor space S is not limited to the internal space of a warehouse, but refers to any indoor spaces, such as offices, houses, factories, hypermarkets, shopping malls, department stores, etc. The multi-camera positioning and dispatching system 1 can be applied to any indoor spaces.

A specific point of the indoor space S could be defined as the origin O, and x-axis, y-axis and z-axis could be defined based on the origin O to establish a world coordinate system in order to indicate the coordinates, in the real world, of each of the positions of the indoor space S. If the multi-camera positioning and dispatching system 1 is applied to a pinhole camera model, the processing device 12 performs the coordinate conversion corresponding thereto, as show in Equation (1) given below:

$$K = \begin{bmatrix} \alpha_x & 0 & u_0 \\ 0 & \alpha_y & v_0 \\ 0 & 0 & 1 \end{bmatrix} \quad (1)$$

In Equation (1), K stands for the intrinsic matrix of each of the cameras 11; $a_x$ and $a_y$, stand for the focus length of the lens of the camera 11; $u_0$ and $v_0$ stand for the coordinate of the central point of the image captured by the camera 11.

Thus, the processing device 12 can convert the pixel coordinates of each of the areas into the camera coordinates of the area according to the intrinsic matrix of the camera 11 corresponding to the area, and convert the camera coordinates of the area into the world coordinates of the area in the image captured by the camera 11, as shown in Equation (2) given below:

$$\begin{bmatrix} X_c \\ Y_c \\ Z_c \\ 1 \end{bmatrix} = \begin{bmatrix} R & T \\ 0^T & 1 \end{bmatrix} \begin{bmatrix} X_w \\ Y_w \\ Z_w \\ 1 \end{bmatrix} \quad (2)$$

In Equation (2), $(X_c, Y_c, Z_c)$ stands for the camera coordinate of any position of the area; $(X_w, Y_w, Z_w)$ stands for the world coordinate corresponding to the position; R and T stand for the extrinsic matrix of the camera 11, wherein R stands for the rotation parameter of the camera 11 and T stands for the translation parameter of the camera 11.

The full calculation process is as shown in Equation (3) given below:

$$x = \begin{bmatrix} u \\ v \\ 1 \end{bmatrix} = K \begin{bmatrix} 1 & 0 & 0 & 0 \\ 0 & 1 & 0 & 0 \\ 0 & 0 & 1 & 0 \end{bmatrix} \begin{bmatrix} R & T \\ 0^T & 1 \end{bmatrix} \begin{bmatrix} X_w \\ Y_w \\ Z_w \\ 1 \end{bmatrix} = K[R \mid T] \begin{bmatrix} X_w \\ Y_w \\ Z_w \\ 1 \end{bmatrix} \quad (3)$$

Equation (3) defines a 3×4 projection matrix from Euclidean 3-space to an image, as shown in Equation (4) given below:

$$x = P \begin{bmatrix} X \\ 1 \end{bmatrix}, P = K[R \mid T] \quad (4)$$

In Equation (4), x stands for the pixel coordinate of each of the positions of the area, which could be shown as (u, v), the 1×3 matrix of Equation (3); $X(=(X_w, Y_w, Z_w))$ stands for the world coordinate corresponding to the position. As described above, K stands for the intrinsic matrix of the camera 11 corresponding to the area; R and T stand for the extrinsic matrix of the camera 11.

If the multi-camera positioning and dispatching system 1 is applied to a fisheye camera model, the processing device 12 performs the coordinate conversion corresponding thereto. If there is a given point in the plane of $z_c=1$ (camera coordinate), the world coordinate of the given point is $X=(X_w, Y_w, Z_w)$; the pinhole projection thereof is as show by Equation (5) given below:

$$\begin{cases} r = \sqrt{X_w^2 + Y_w^2} \\ \theta = \mathrm{atan2}(r, |Z_w|) = \mathrm{atan2}(r, 1) = \mathrm{atan}(r) \end{cases} \quad (5)$$

Equation (5) can be expressed in another way, as shown in Equation (6) given below:

$$f = r' \cdot \tan(\theta) \quad (6)$$

In Equation (6), $r' = \sqrt{u^2 + v^2}$; θ stands for the included angle, relative to the lens, of each of the positions of the area; r stands for the distance between the position and the central point of the lens; f stands for the scalar factor; (u, v) stands for the pixel coordinate of the position of the area.

Accordingly, the fisheye distortion can be shown by Equation (7) given below:

$$\theta_d = \theta(1 + k1 \cdot \theta^2 + k2 \cdot \theta^4 + k3 \cdot \theta^6 + k4 \cdot \theta^8) \quad (7)$$

In Equation (7), $\theta_d$ stands for fisheye distortion; k1~k4 stand for the structural parameters of the lens.

Therefore, the distorted point coordinate can be shown by Equation (8) given below:

$$\begin{cases} x_d = \dfrac{\theta_d X_c}{r} \\ y_d = \dfrac{\theta_d Y_c}{r} \end{cases} \quad (8)$$

In Equation (8), ($x_d$, $y_d$) stands for the distorted point coordinate.

After Equation (8) is converted into the pixel coordinate, the final pixel coordinate vector can be shown by Equation (9) given below:

$$\begin{cases} u = f_x(x_d + \alpha y_d) + c_x \\ v = f_y \cdot y_d + c_y \end{cases} \quad (9)$$

In Equation (9), (u, v) stands for the pixel coordinate of each of the positions of the area; $f_x$ stands for the scalar factor; α stands for the deformation parameter; $c_x$ and $c_y$ stand for the displacement parameters.

Equation (9) can be shown by a matrix form via Equation (10) given below:

$$\begin{bmatrix} u \\ v \\ 1 \end{bmatrix} = \begin{bmatrix} f_x & \alpha & c_x \\ 0 & f_y & c_y \\ 0 & 0 & 1 \end{bmatrix} \begin{bmatrix} x_d \\ y_d \\ 1 \end{bmatrix} \quad (10)$$

Accordingly, the processing device 12 can convert the pixel coordinates of any one of the areas into the camera coordinates of the area and convert the camera coordinates of the area into the world coordinates of the area in the image captured by the camera 11 corresponding to the area.

Next, the processing device 12 overlays the images captured by the cameras 11 and obtains intersections between the images captured by the cameras 11 so as to integrate the images captured by the cameras 11 with one another. In this way, the processing device 12 obtains a panoramic map, defined by the world coordinate system, of the indoor space S. In one embodiment, the processing device 12 may be any computer devices, such as a server, a laptop, a personal computer, etc. The processing device 12 obtains the relative position relation between each of the cameras 11 and the indoor space S according to the feature points of the image captured by the camera 11. Afterward, the processing device 12 generates the panoramic map by overlaying the images captured by the cameras 11 and obtains intersections between the images captured by the cameras 11 according to the relative position relations between the cameras 11 and the indoor space S.

When the image captured by any one of the cameras 11 includes a working unit U, the processing device 12 projects the working unit U to the panoramic map according to the pixel coordinate of the working unit U in the image captured by the camera 11 and the relative position relation between the camera 11 and the indoor space S, and simultaneously obtains the world coordinate of the working unit U. In other words, the panoramic map coordinate system of the panoramic map is the world coordinate system, so the panoramic map coordinates of the panoramic map coordinate system are the world coordinates. Accordingly, the multi-camera positioning and dispatching system 1 can position all of the working units U in the indoor space S. In one embodiment, the working unit may be, but not limited to, a tally clerk or a transportation vehicle (e.g., an automated guided vehicle); the working unit may be any objects in the indoor space S.

In the above step, the processing device 12 performs an image recognition deep learning algorithm to mark the working units U of the image of each of the cameras 11 by a bounding box. Then, the processing device 12 processes the image of the camera 11 by a convolutional neural network (CNN) so as to calculate the probability of the working unit U being a tally clerk and the probability of the working unit U being a transportation vehicle. Afterward, the processing device 12 outputs the recognition result and the coordinate of the working unit U.

Figure 3A:
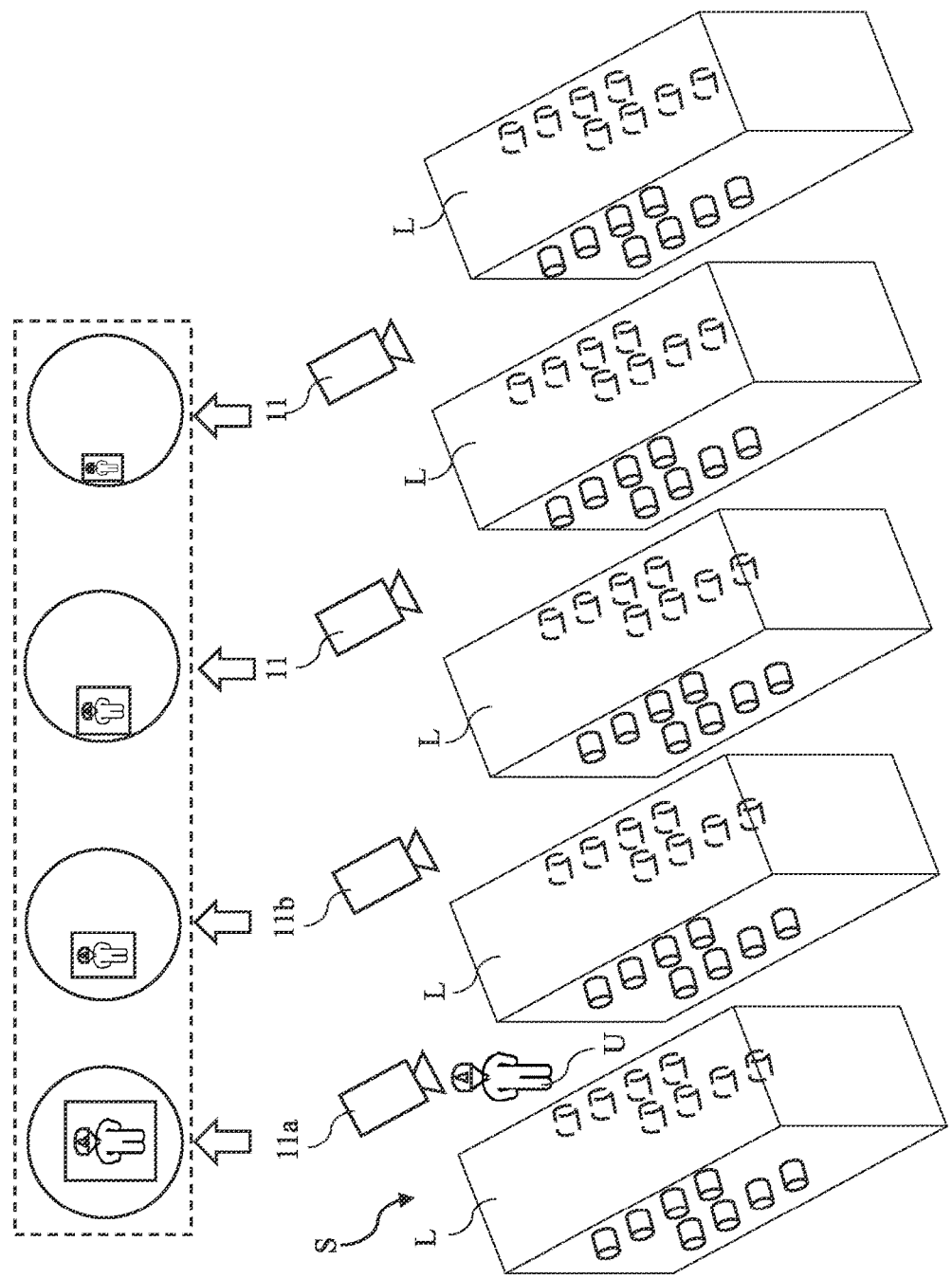
FIG. 3A is a first schematic view of generating a panoramic map by the multi-camera positioning and dispatching system in accordance with the first embodiment of the disclosure.
Figure 3B:
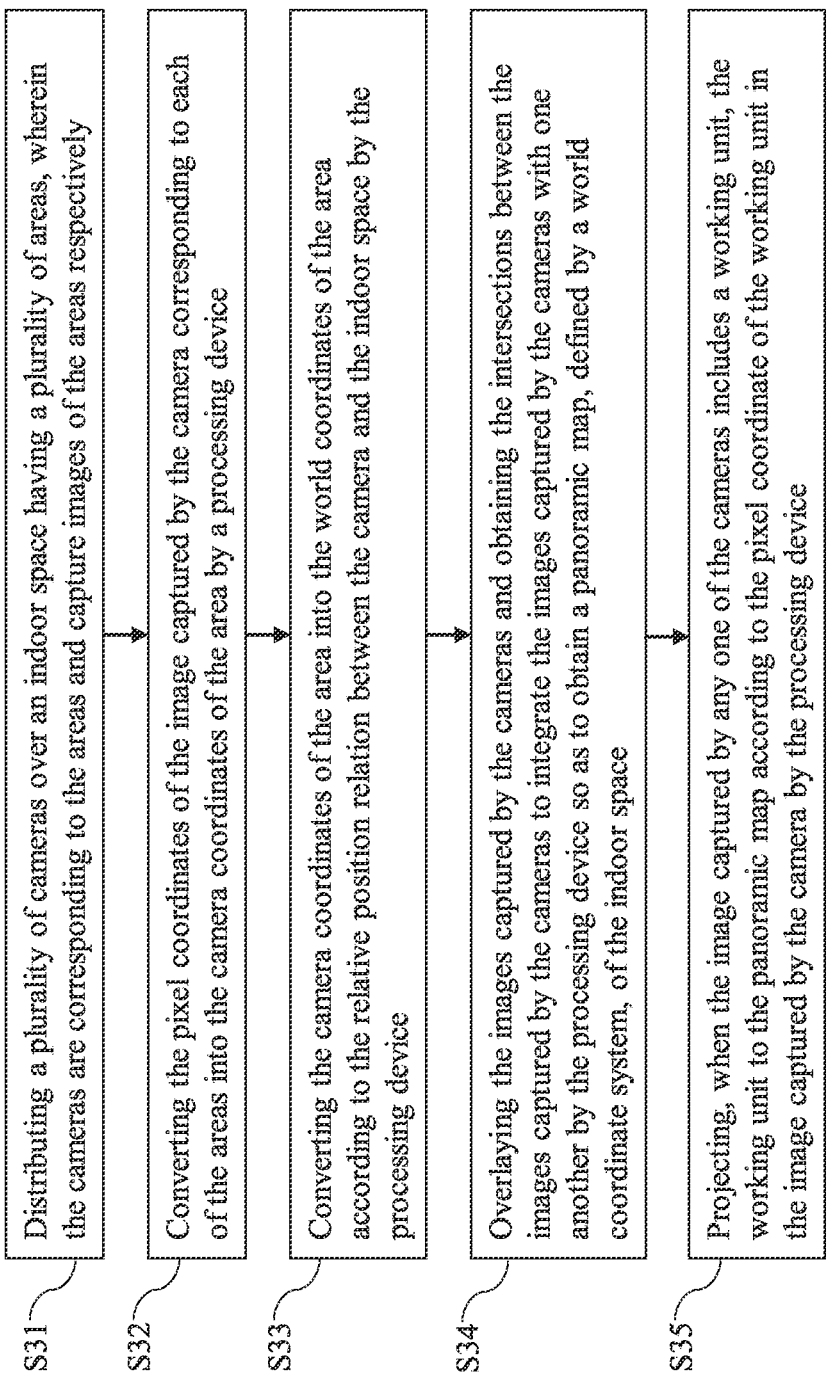
FIG. 3B is a second schematic view of generating the panoramic map by the multi-camera positioning and dispatching system in accordance with the first embodiment of the disclosure.
Figure 3C:
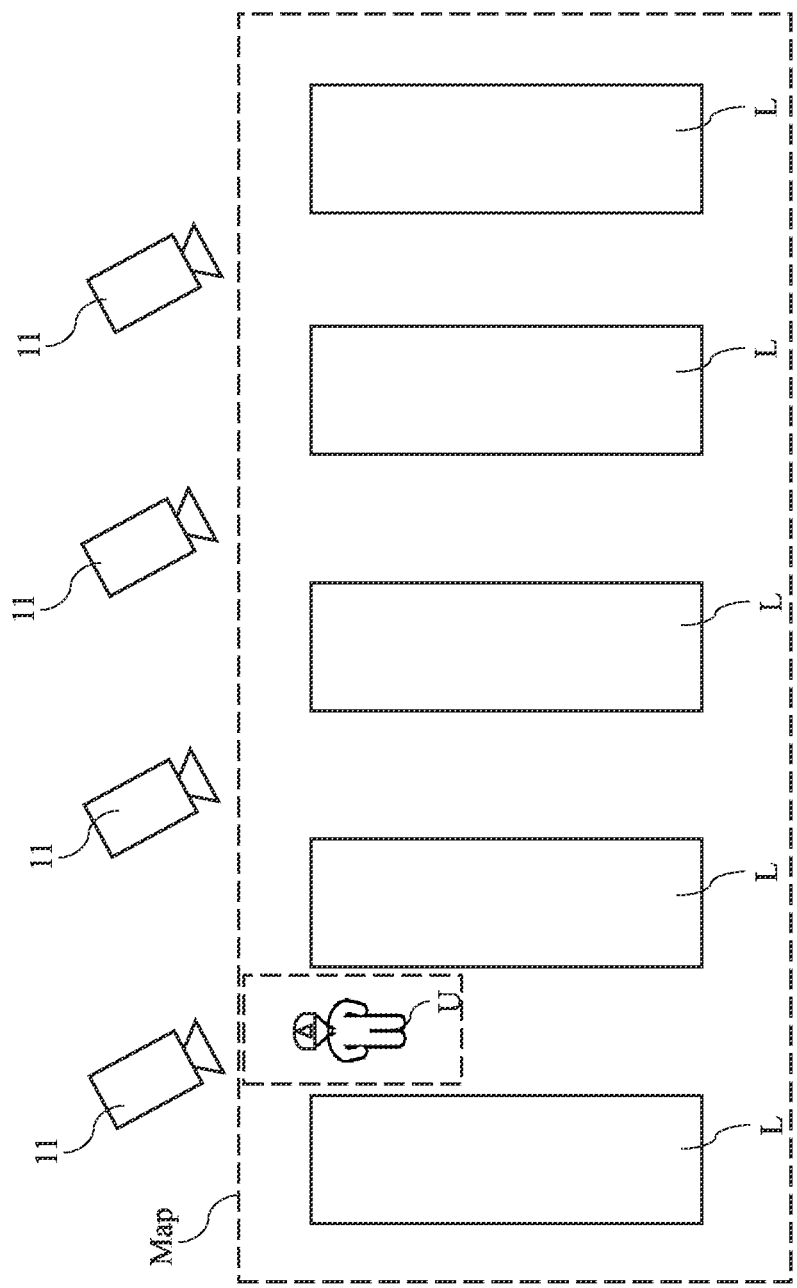
FIG. 3C is a third schematic view of generating the panoramic map by the multi-camera positioning and dispatching system in accordance with the first embodiment of the disclosure.

Please refer to FIG. 3A, FIG. 3B and FIG. 3C, which are a first schematic view, a second schematic view and a third schematic view of generating a panoramic map by the multi-camera positioning and dispatching system in accordance with the first embodiment of the disclosure respectively. As shown in FIG. 3A, the cameras 11 distributed over the indoor space S are corresponding to different areas and capture the images of the areas respectively. Each of the areas is defined as the coverage of the image captured by the corresponding camera 11.

As shown in FIG. 3B, the processing device 12 converts the pixel coordinate of each of the positions of the image captured by the corresponding camera 11 into the camera coordinate of the position according to Equation (1). Then, the processing device 12 converts the camera coordinate of each of the positions of the image captured by the corresponding camera 11 into the world coordinate of the position according to Equation (2). After that, the processing device 12 overlays the images captured by the cameras 11 and obtain the intersections between the images captured by the cameras 11 to generate the panoramic map Map shown in FIG. 3C. The above process includes the following steps:

Step S31: distributing a plurality of cameras over an indoor space having a plurality of areas, wherein the cameras are corresponding to the areas and capture images of the areas respectively.

Step S32: converting the pixel coordinates of the image captured by the camera corresponding to each of the areas into the camera coordinates of the area by a processing device.

Step S33: converting the camera coordinates of the area into the world coordinates of the area according to the relative position relation between the camera and the indoor space by the processing device.

Step S34: overlaying the images captured by the cameras and obtaining the intersections between the images captured by the cameras to integrate the images captured by the cameras with one another by the processing device so as to obtain a panoramic map, defined by a world coordinate system, of the indoor space.

Step S35: projecting, when the image captured by any one of the cameras includes a working unit, the working unit to the panoramic map according to the pixel coordinate of the working unit in the image captured by the camera by the processing device.

As shown in FIG. 3C, when the images of some cameras 11 include the working units U, the processing device 12 can project the working units U to the panoramic map Map according to the pixel coordinates of the working units U in the images captured by the cameras 11, and the relative relation between the cameras 11 and the panoramic map Map so as to position the working units U.

Via the above mechanism, the multi-camera positioning and dispatching system 1 can generate the panoramic map Map of the indoor space S via the cameras 11, and obtain the real coordinates of the working units U and the positions of the shelves adjacent thereto.

Figure 4A:
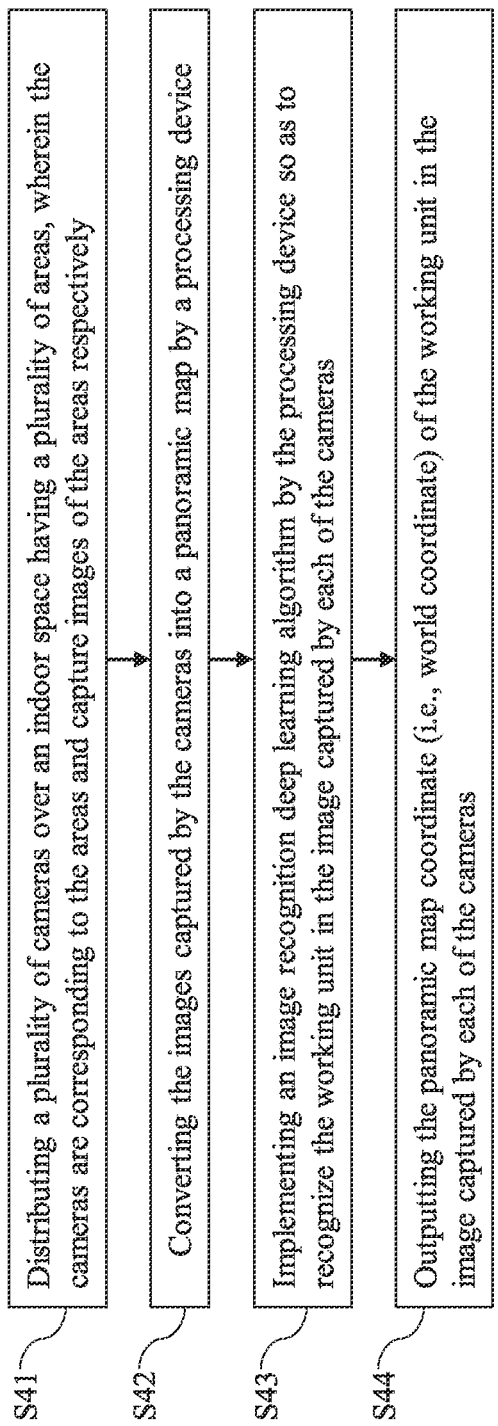
FIG. 4A is a flow chart of a monitoring method of the multi-camera positioning and dispatching system in accordance with the first embodiment of the disclosure.
Figure 4B:
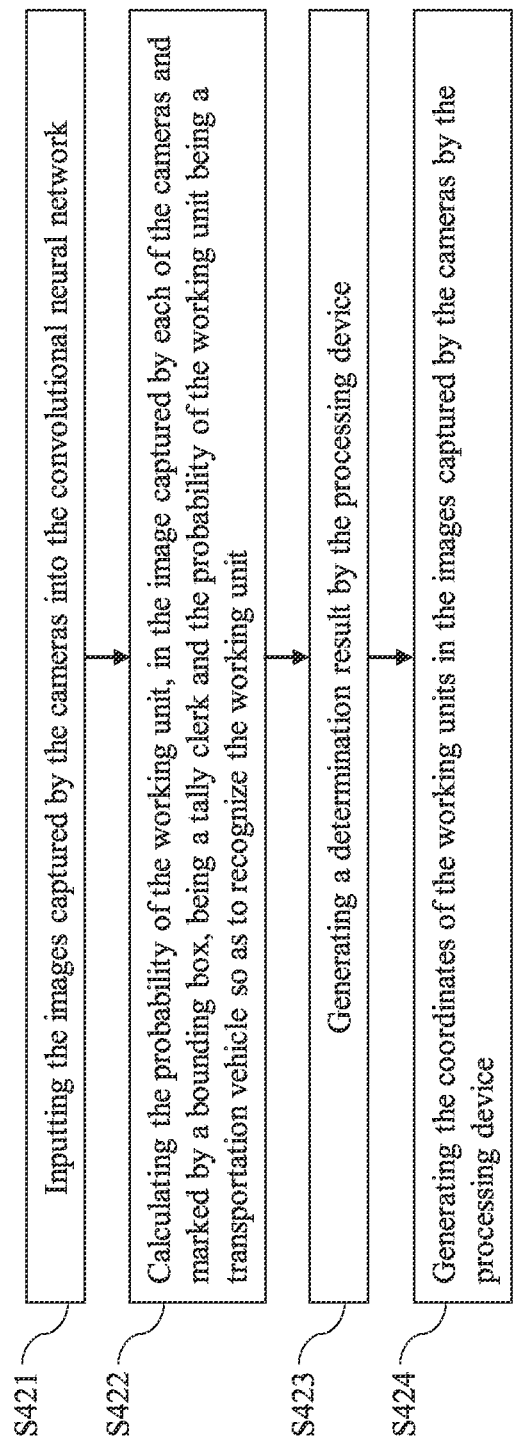
FIG. 4B is a flow chart of an image recognition deep learning algorithm of the multi-camera positioning and dispatching system in accordance with the first embodiment of the disclosure.

Please refer to FIG. 4A and FIG. 4B, which are a flow chart of a monitoring method and a flow chart of an image recognition deep learning algorithm of the multi-camera positioning and dispatching system in accordance with the first embodiment of the disclosure respectively. As set forth above, the multi-camera positioning and dispatching system 1 of the embodiment adopts a special monitoring method. The multi-camera positioning and dispatching system 1 receives the images captured by the cameras 11 distributed over the indoor space S and converts the images captured by the cameras 11 into the panoramic map Map, defined by the world coordinate system, of the indoor space S. Then, the multi-camera positioning and dispatching system 1 projects the working units U to the panoramic map Map and simultaneously obtains the world coordinates of the working units U in order to position the working units U.

Further, as described above, the multi-camera positioning and dispatching system 1 determines whether the working units U in the images captured by the cameras 11 are tally clerks or transportation vehicles via the image recognition deep learning algorithm. FIG. 4A and FIG. 4B describes the monitoring method and the image recognition deep learning algorithm of the embodiment respectively.

As shown in FIG. 4A, the monitoring method of the multi-camera positioning and dispatching system 1 includes the following steps:

Step S41: distributing a plurality of cameras over an indoor space having a plurality of areas, wherein the cameras are corresponding to the areas and capture images of the areas respectively.

Step S42: converting the images captured by the cameras into a panoramic map by a processing device.

Step S43: implementing an image recognition deep learning algorithm by the processing device so as to recognize the working unit in the image captured by each of the cameras.

Step S44: outputting the panoramic map coordinate (i.e., world coordinate) of the working unit in the image captured by each of the cameras.

As shown in FIG. 4B, the aforementioned image recognition deep learning algorithm includes the following steps:

Step S421: inputting the images captured by the cameras into the convolutional neural network.

Step S422: calculating the probability of the working unit, in the image captured by each of the cameras and marked by a bounding box, being a tally clerk and the probability of the working unit being a transportation vehicle so as to recognize the working unit.

Step S423: generating a determination result by the processing device.

Step S424: generating the coordinates of the working units in the images captured by the cameras by the processing device.

Next, as shown in FIG. 1, the calculation device 13 analyzes the order data and the warehouse data of the warehouse management system M and the positions of the working units U in the panoramic map Map in order to generate an analysis result. In this step, the calculation device 13 can generate the analysis result by analyzing the aforementioned data by a deep reinforcement learning algorithm. In one embodiment, the deep reinforcement learning algorithm may be Deep Q-Learning algorithm or other similar algorithms. In one embodiment, the calculation device 13 may be any computer devices, such as a server, a laptop, a personal computer, etc.

Afterward, the calculation device 13 executes a warehouse resource planning & dispatching algorithm to generate a task assignment and a moving path planning according to the analysis result. In this step, the calculation device 13 can perform Pointer Network algorithm to generate the task assignment and the moving path planning. In another embodiment, the calculation device 13 can also execute other currently available algorithms, such as the algorithm disclosed by Taiwan patent application No. 107130814.

Figure 5:
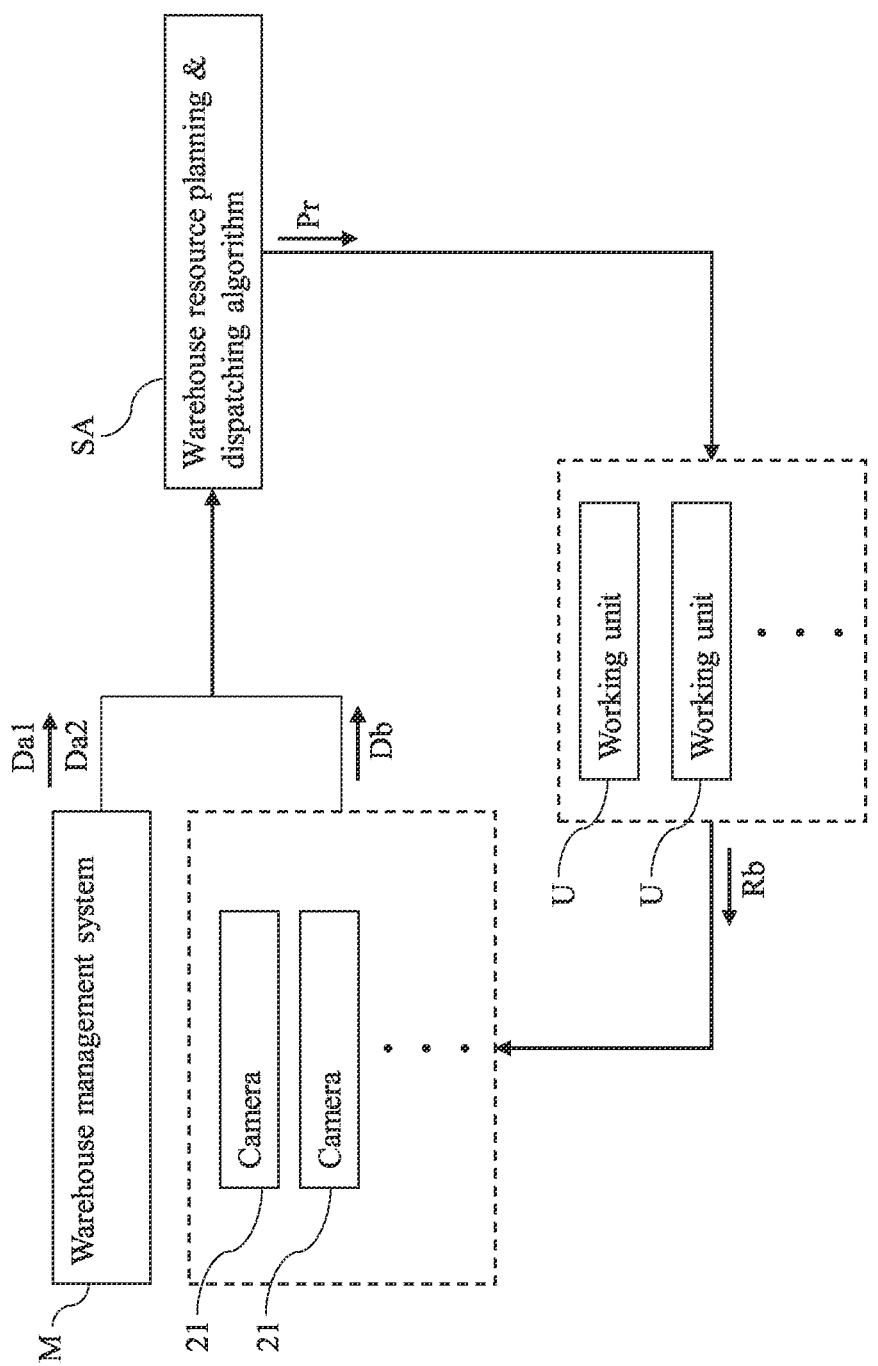
FIG. 5 is a schematic view of an application scenario of the multi-camera positioning and dispatching system in accordance with the first embodiment of the disclosure.

Please refer to FIG. 5, which is a schematic view of an application scenario of the multi-camera positioning and dispatching system in accordance with the first embodiment of the disclosure. FIG. 5 illustrates one of the application scenarios that the multi-camera positioning and dispatching system 1 performs the aforementioned monitoring method and the warehouse resource planning & dispatching algorithm for a logistics warehouse.

As shown in FIG. 5, the warehouse management system M outputs the order data Da1 and the warehouse data Da2, and the images captured by the cameras 11 are processed by the aforementioned monitoring method to generate the coordinates Db of the working units U. Then, the calculation device 13 executes the warehouse resource planning & dispatching algorithm SA (the details of the algorithm are described in FIG. 6A and FIG. 6B) according to the order data Da1, the warehouse data Da2 and the coordinates Db of the working units U so as to generate the task assignment and the moving path planning Pr. The object of the task assignment and the moving path planning Pr is to average the workloads of the working units U and optimize the moving paths of the working units U with a view to effectively prevent from collision between the working units U and avoid that the moving paths of the working units U overlap. Then, the working units U in the logistics warehouse carry out their tasks respectively according to the aforementioned task assignment and moving path planning Pr, and the cameras 11 keep monitoring the working units U in real time so as to update the coordinates Db of the working units U. In this way, the calculation device 13 can execute the warehouse resource planning & dispatching algorithm SA again according to the order data Da1, the warehouse data Da2 and the updated coordinates Rb of the working units U in order to update the task assignment and the moving path planning Pr.

Figure 6A:
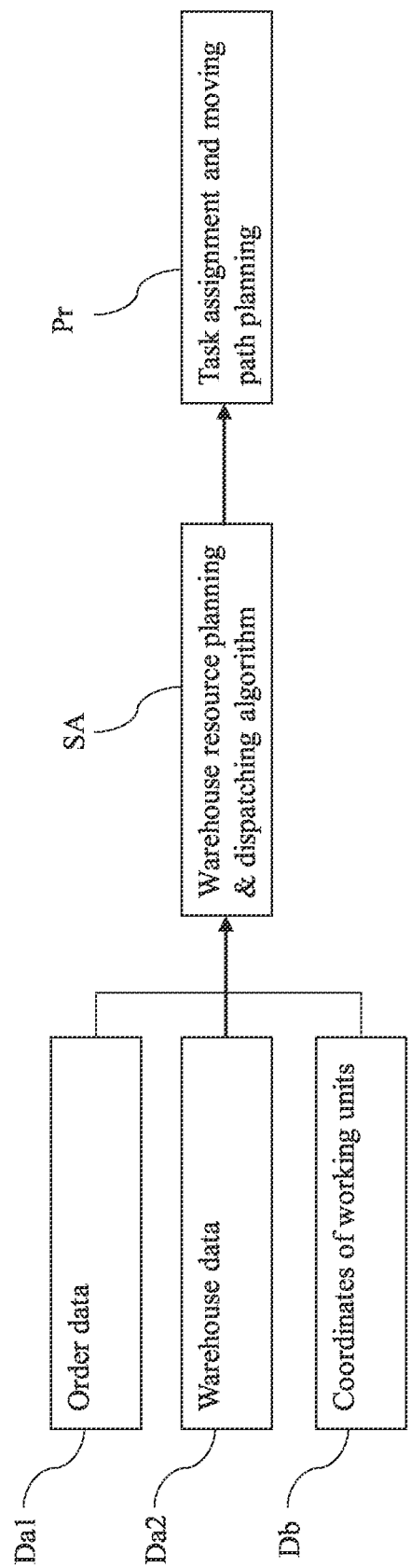
FIG. 6A is a schematic view of executing a warehouse resource planning & dispatching algorithm of the multi-camera positioning and dispatching system in accordance with the first embodiment of the disclosure.
Figure 6B:
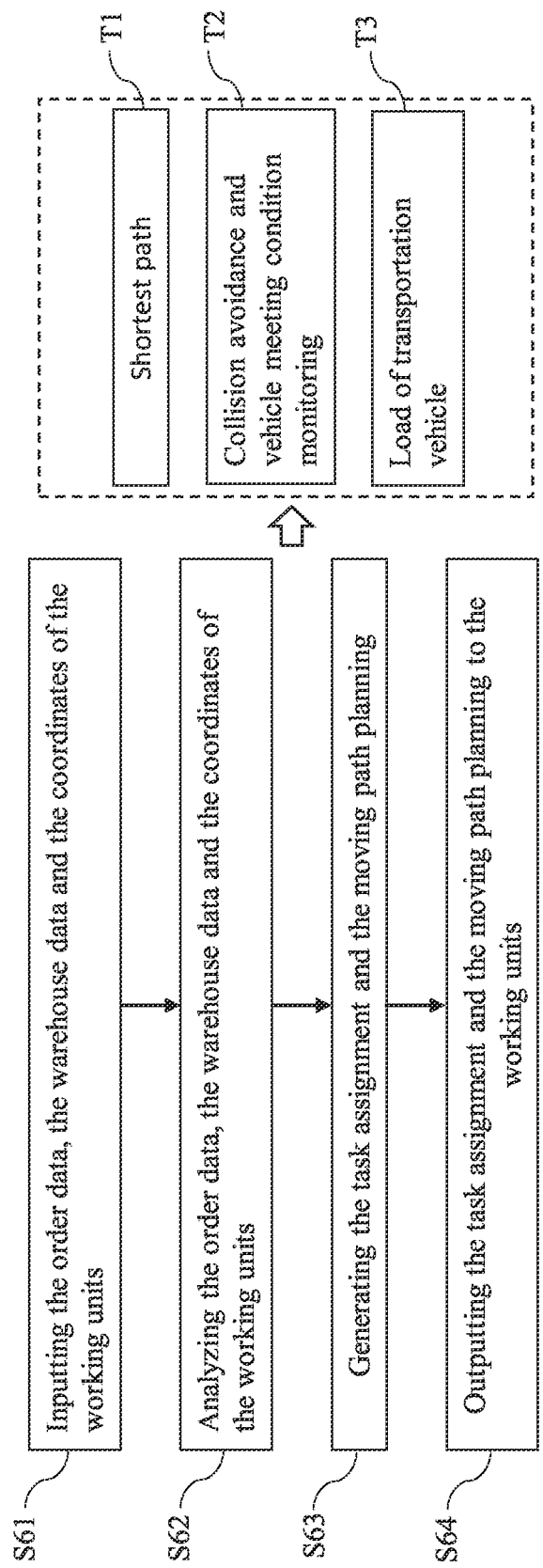
FIG. 6B is a flow chart of detailed steps of the warehouse resource planning & dispatching algorithm of the multi-camera positioning and dispatching system in accordance with the first embodiment of the disclosure.

Please refer to FIG. 6A and FIG. 6B. FIG. 6A is a schematic view of executing a warehouse resource planning & dispatching algorithm of the multi-camera positioning and dispatching system in accordance with the first embodiment of the disclosure. FIG. 6B is a flow chart of the detailed steps of the warehouse resource planning & dispatching algorithm of the multi-camera positioning and dispatching system in accordance with the first embodiment of the disclosure. As shown in FIG. 6A, the calculation device 13 receives the order data Da1, the warehouse data Da2 and the coordinates Db of the working units U. Afterward, the calculation device 13 performs the warehouse resource planning & dispatching algorithm SA according to the order data Da1, the warehouse data Da2 and the coordinates Db of the working units U so as to generate the task assignment and the moving path planning Pr.

As shown in FIG. 6B, the detailed steps of the warehouse resource planning & dispatching algorithm SA are as follows:

Step S61: inputting the order data, the warehouse data and the coordinates of the working units.

Step S62: analyzing the order data, the warehouse data and the coordinates of the working units.

Step S63: generating the task assignment and the moving path planning. In the step, the major considerations of the moving path planning may include one or more of shortest path T1, collision avoidance and vehicle meeting condition monitoring T2 and load of transportation vehicle T3.

Step S64: outputting the task assignment and the moving path planning to the working units.

Figure 7A:
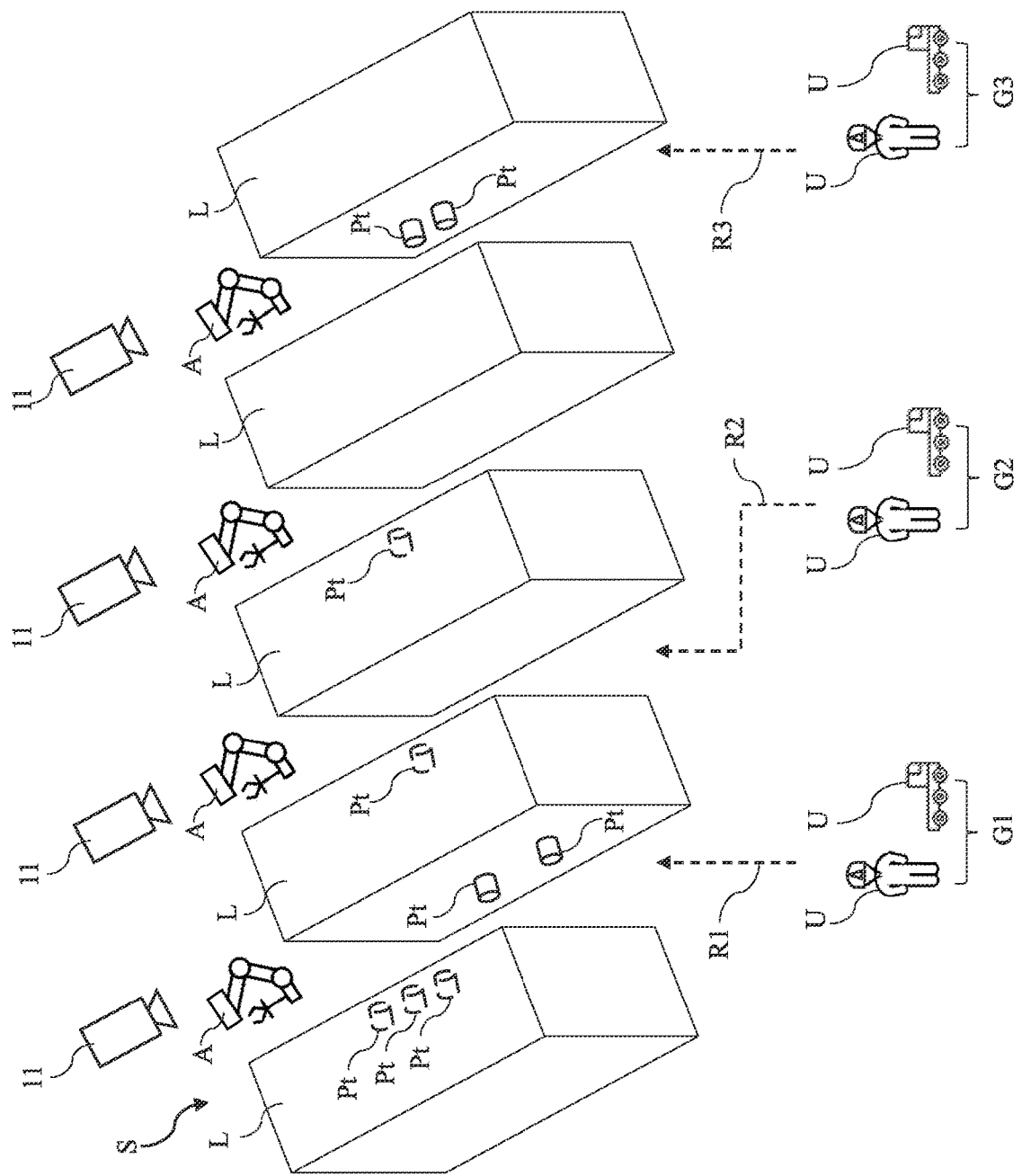
FIG. 7A is a first schematic view of task assignment and moving path planning of the multi-camera positioning and dispatching system in accordance with the first embodiment of the disclosure.
Figure 7B:
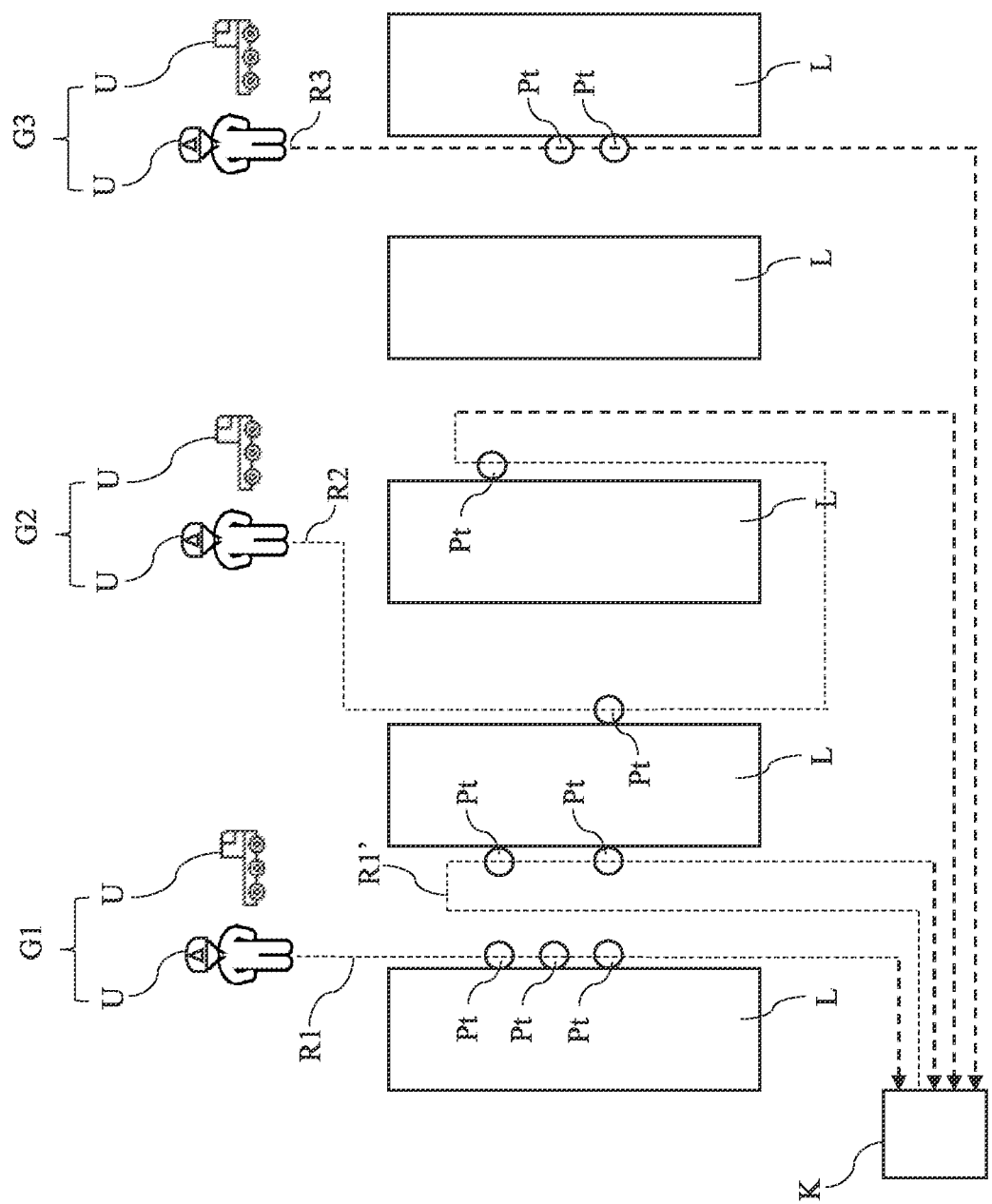
FIG. 7B is a second schematic view of task assignment and moving path planning of the multi-camera positioning and dispatching system in accordance with the first embodiment of the disclosure.
Figure 7C:
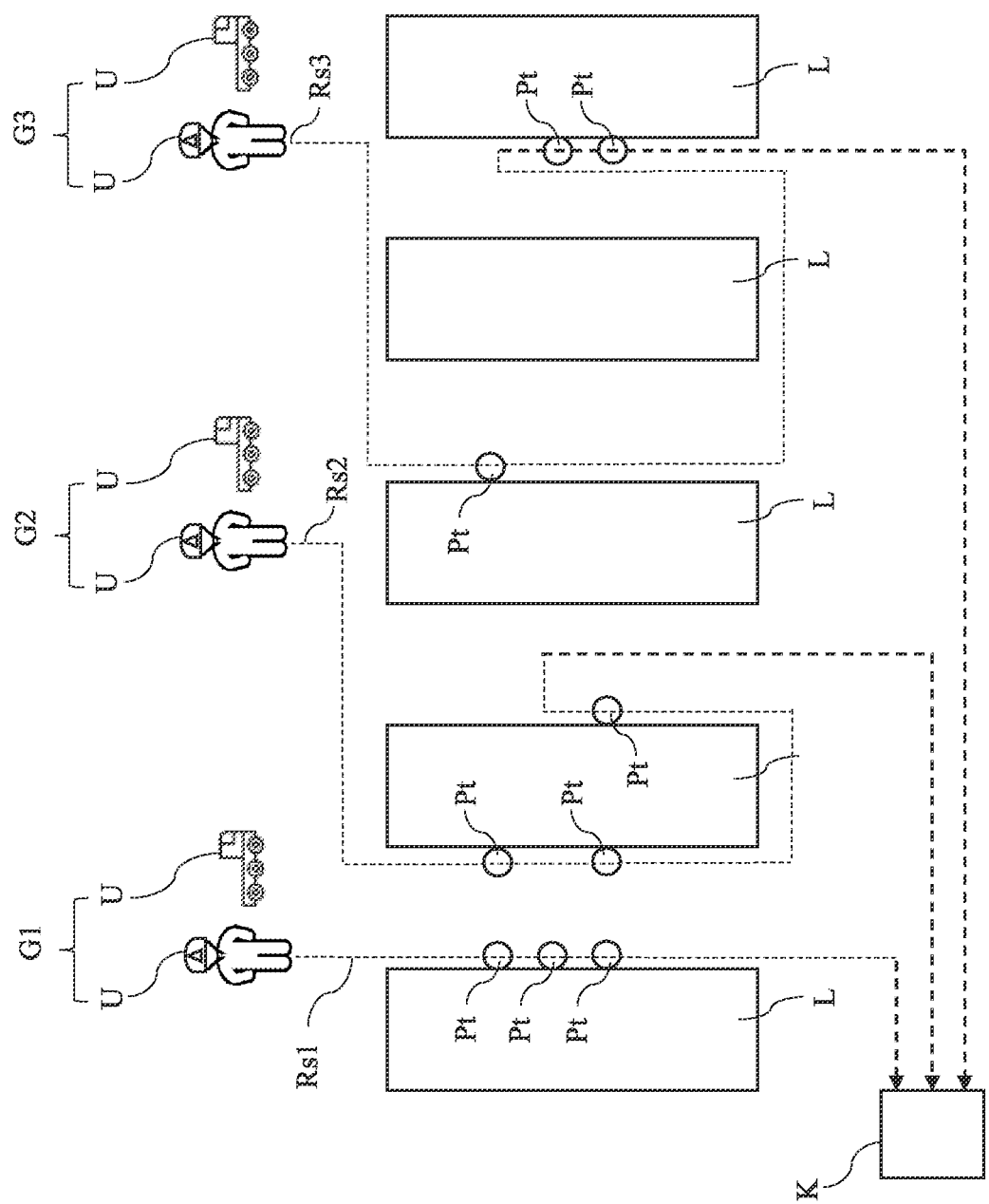
FIG. 7C is a third schematic view of task assignment and moving path planning of the multi-camera positioning and dispatching system in accordance with the first embodiment of the disclosure.
Figure 9:
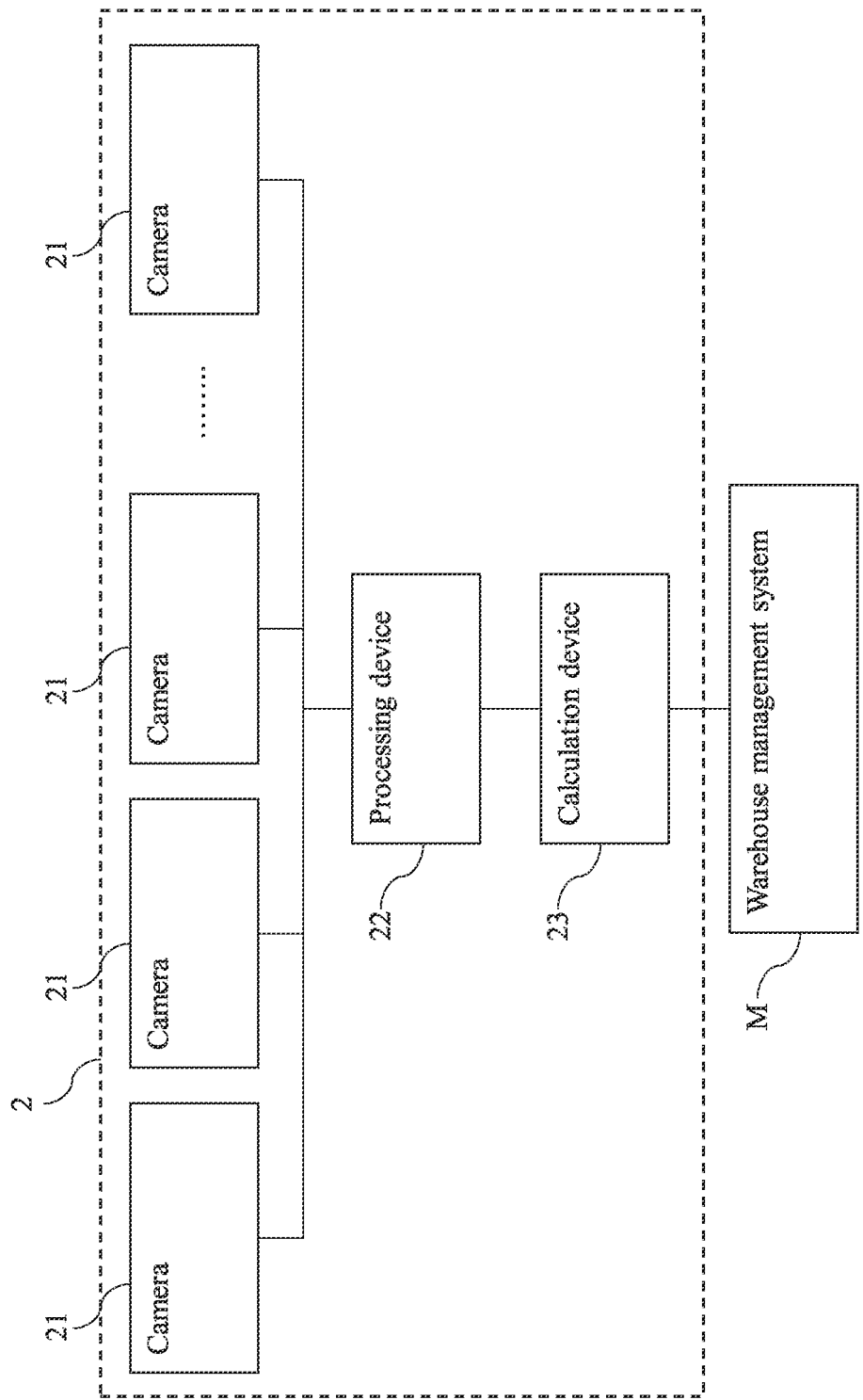
FIG. 9 is a block diagram of a multi-camera positioning and dispatching system in accordance with a second embodiment of the disclosure.

Please refer to FIG. 7A, FIG. 7B and FIG. 7C, which are a first schematic view, a second schematic view and a third schematic view of task assignment and moving path planning of the multi-camera positioning and dispatching system in accordance with the first embodiment of the disclosure respectively. As shown in FIG. 7A, 9 products Pt of an order are distributed over different shelves L. Several working unit groups G1, G2, G3 reach the positions of the products Pt via the path R1, the path R2 and the path R3, and load or unload the products Pt by the robotic arms A.

However, the working unit groups G1, G2, G3 cannot efficiently carry out their tasks without proper task assignment and moving path planning. As shown in FIG. 7B, the working unit group G1 transports 3 products Pt to the operation area K along the path R1, and the working unit group G2 and the working unit group G3 respectively transport 2 products Pt to the operation area K along the path R2 and the path R3. It is obvious that the workload of the working unit group G1 is greater than the workloads of the working unit group G2 and the working unit group G3. Therefore, the workloads of the working unit groups G1, G2, G3 fail to be evenly assigned and the working unit groups G1, G2, G3 cannot carry out their tasks by shortest paths.

As shown in FIG. 7C, the calculation device 13 executes the warehouse resource planning & dispatching algorithm SA, and generates the task assignment and the moving path planning according to the analysis result. The calculation device 13 can execute an algorithm, such as Pointer Network algorithm, according to the analysis result in order to generate the task assignment and the moving path planning. In another embodiment, the calculation device 13 may execute other currently available algorithms, such as the algorithm disclosed by Taiwan patent application No. 107130814. Via the above mechanism, the calculation device 13 can average the workloads of the working unit groups G1, G2, G3, so the working unit groups G1, G2, G3 can transport 3 products Pt respectively. Besides, the working unit groups G1, G2, G3 can reach the operation area K along the shortest paths Rs1, Rs2, Rs3. Accordingly, the multi-camera positioning and dispatching system 1 can effectively enhance the efficiency of the warehouse management and save more manpower.

Since there is no method capable of effectively positioning and dispatching workers and automated guided vehicles for now, the efficiency of the warehouse management of product suppliers may be low because of various warehouse problems, which may influence the delivery time and waste a lot of manpower. However, according to one embodiment of the disclosure, the multi-camera positioning and dispatching system 1 can overlay the images captured by the cameras 11 and obtain the intersections between the images captured by the cameras 11 to integrate the images 11 captured by all of the cameras 11 with one another so as to obtain a panoramic map Map of the indoor space S. In addition, the multi-camera positioning and dispatching system 1 can project the working unit U in the image captured by any one of the cameras 11 to the panoramic map Map and effectively position the working units U of the indoor space S. Furthermore, the multi-camera positioning and dispatching system 1 can analyze the order data Da1 and the warehouse data Da2 of the warehouse management system M and the coordinates Db of the working units U in order to generate the analysis result. Then, the multi-camera positioning and dispatching system 1 can generate the task assignment and the moving path planning Pr according to the analysis result, so the multi-camera positioning and dispatching system 1 can average the workloads of the working units U (the working units U may be, but not limited to, tally clerks and transportation vehicles, such as automated guided vehicles) and optimize the moving paths thereof with a view to increase the efficiency of the warehouse management and save more manpower.

The embodiment just exemplifies the disclosure and is not intended to limit the scope of the disclosure. Any equivalent modification and variation according to the spirit of the disclosure is to be also included within the scope of the following claims and their equivalents.

Figure 8:
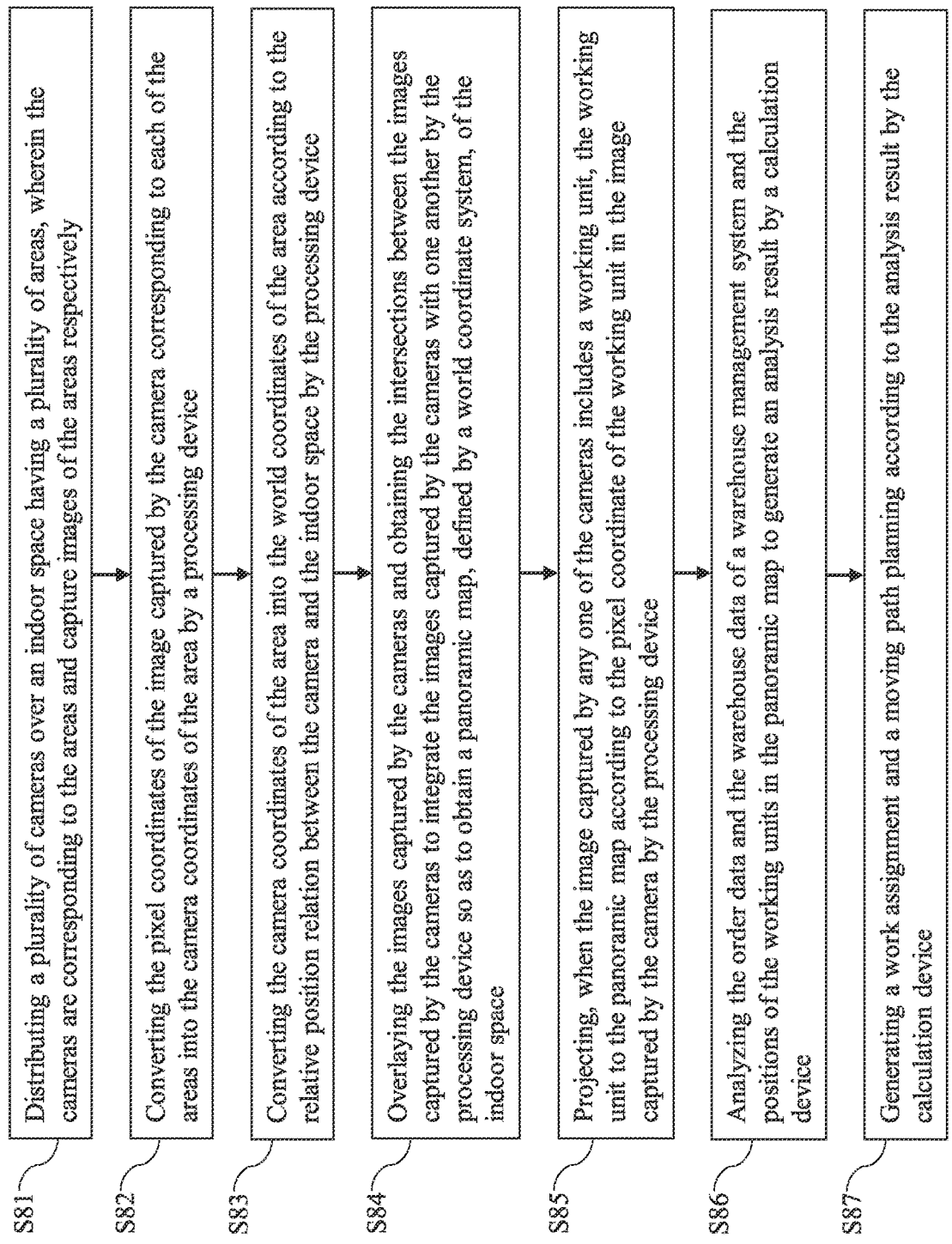
FIG. 8 is a flow chart of a multi-camera positioning and dispatching method in accordance with the first embodiment of the disclosure.

Please refer to FIG. 8, which is a flow chart of a multi-camera positioning and dispatching method in accordance with the first embodiment of the disclosure. The multi-camera positioning and dispatching method adopted by the system 1 of the embodiment includes the following steps:

Step S81: distributing a plurality of cameras over an indoor space having a plurality of areas, wherein the cameras are corresponding to the areas and capture images of the areas respectively.

Step S82: converting the pixel coordinates of the image captured by the camera corresponding to each of the areas into the camera coordinates of the area by a processing device.

Step S83: converting the camera coordinates of the area into the world coordinates of the area according to the relative position relation between the camera and the indoor space by the processing device.

Step S84: overlaying the images captured by the cameras and obtaining the intersections between the images captured by the cameras to integrate the images captured by the cameras with one another by the processing device so as to obtain a panoramic map, defined by a world coordinate system, of the indoor space.

Step S85: projecting, when the image captured by any one of the cameras includes a working unit, the working unit to the panoramic map according to the pixel coordinate of the working unit in the image captured by the camera by the processing device.

Step S86: analyzing the order data and the warehouse data of a warehouse management system and the positions of the working units in the panoramic map to generate an analysis result by a calculation device.

Step S87: generating a task assignment and a moving path planning according to the analysis result by the calculation device.

Figure 10A:
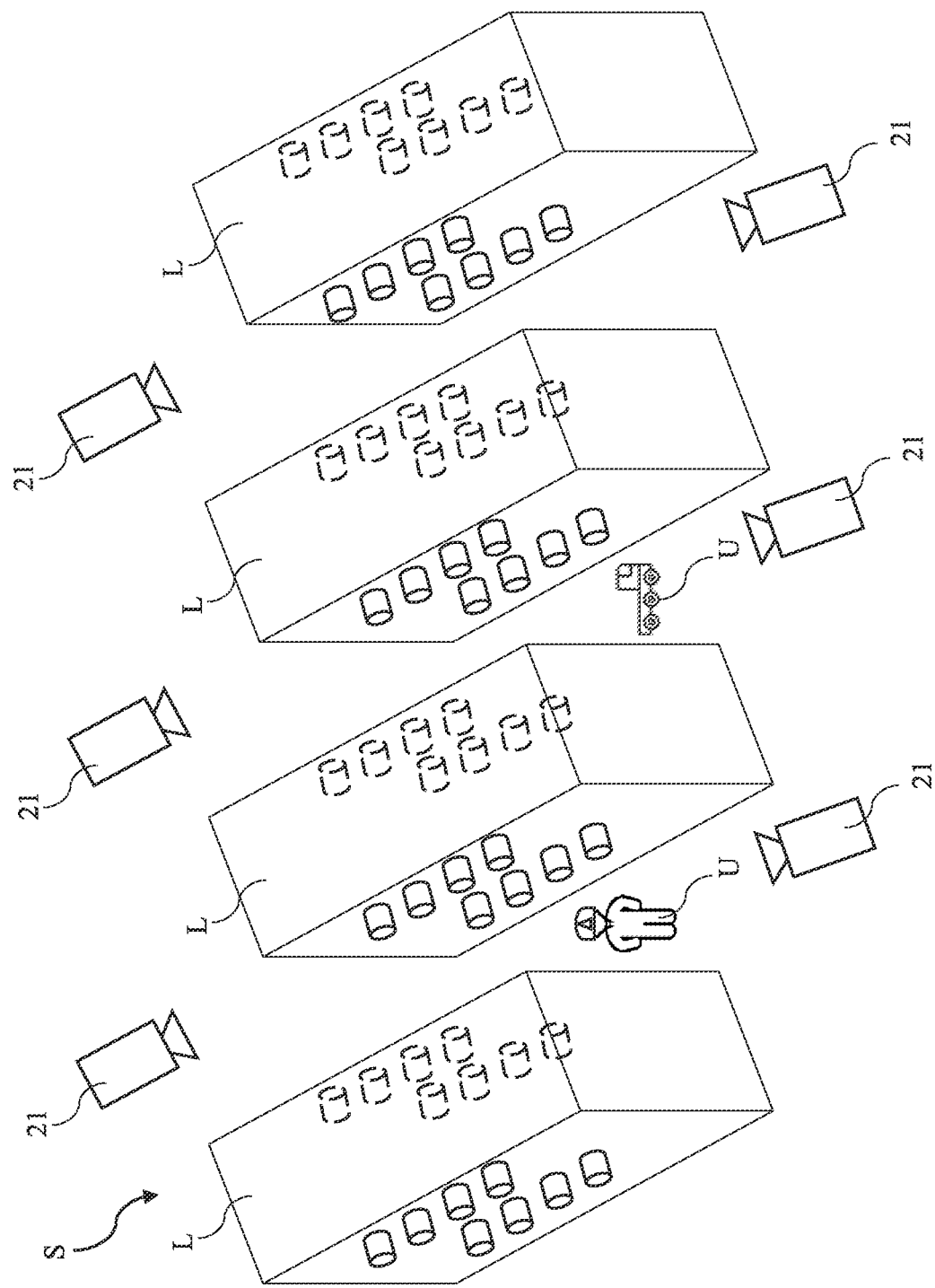
FIG. 10A is a first schematic view of generating a panoramic map by the multi-camera positioning and dispatching system in accordance with the second embodiment of the disclosure.
Figure 10B:
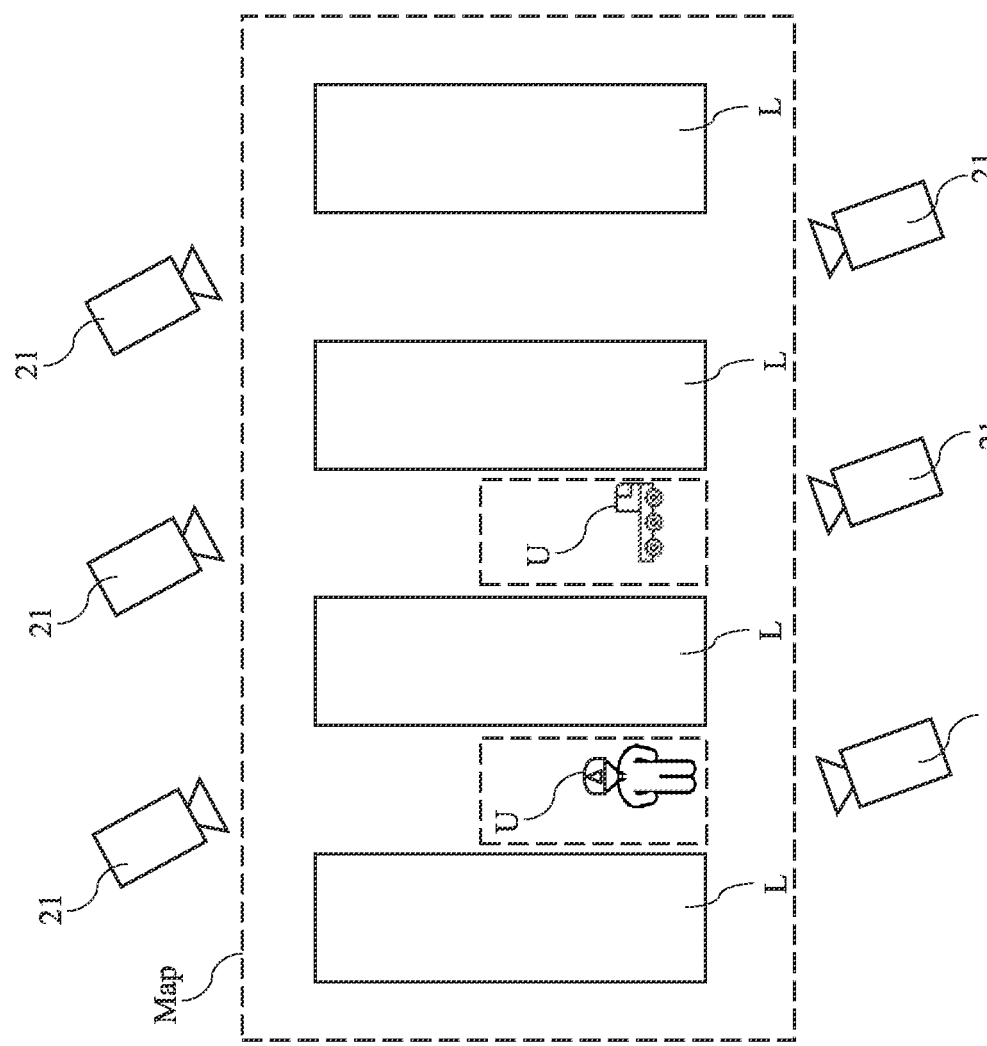
FIG. 10B is a second schematic view of generating the panoramic map by the multi-camera positioning and dispatching system in accordance with the second embodiment of the disclosure.

Please refer to FIG. 9, FIG. 10A and FIG. 10B. FIG. 9 is a block diagram of a multi-camera positioning and dispatching system in accordance with a second embodiment of the disclosure. FIG. 10A and FIG. 10B are a first schematic view and a second schematic view of generating a panoramic map by the multi-camera positioning and dispatching system in accordance with the second embodiment of the disclosure respectively. As shown in FIG. 9, the multi-camera positioning and dispatching system 2 includes a plurality of cameras 21, a processing device 22 and a calculation device 23. The cameras 21 are coupled to the processing device 22. The processing device 22 is coupled to the calculation device 23. The calculation device 23 is coupled to a warehouse management system M.

As shown in FIG. 10A, the cameras 21 are distributed over an indoor space S. The indoor space S may be divided into a plurality of areas. The cameras 21 are corresponding to the areas and capture the images of the areas respectively. Each of the areas is defined as the coverage of the image captured by the corresponding camera 21. The image captured by any one of the cameras 21 may partially overlap the image captured by another one of the cameras 21. Similarly, the processing device 22 of the multi-camera positioning and dispatching system 2 converts the pixel coordinate of each position of the image of each area, captured by the corresponding camera 21, into the camera coordinate of the position according to Equation (1). Then, the processing device 22 converts the camera coordinate of each of the positions of the image captured by the corresponding camera 21 into the world coordinate of the position according to Equation (2). Afterward, the processing device 22 overlays the images captured by the cameras 21 and obtain the intersections between the images captured by the cameras 21 to generate the panoramic map. The aforementioned indoor space S is not limited to the internal space of a warehouse, but refers to any indoor spaces, such as offices, houses, factories, hypermarkets, shopping malls, department stores, etc. The multi-camera positioning and dispatching system 2 can be applied to any indoor spaces.

Next, as shown in FIG. 10B, when the image captured by any one of the cameras includes a working unit U, the processing device 22 of the multi-camera positioning and dispatching system 2 projects the working unit U to the panoramic map Map according to the pixel coordinate of the working unit U in the image captured by the camera 21 and the relative position relation between the camera 21 and the indoor space S, and simultaneously obtains the world coordinate of the working unit U. Accordingly, the multi-camera positioning and dispatching system 2 can position all of the working units U in the indoor space S.

The operations of the above elements are similar to the first embodiment, so will not be described herein again. The difference between this embodiment and the first embodiment is that this embodiment adopts an image recognition algorithm with higher accuracy.

Figure 11A:
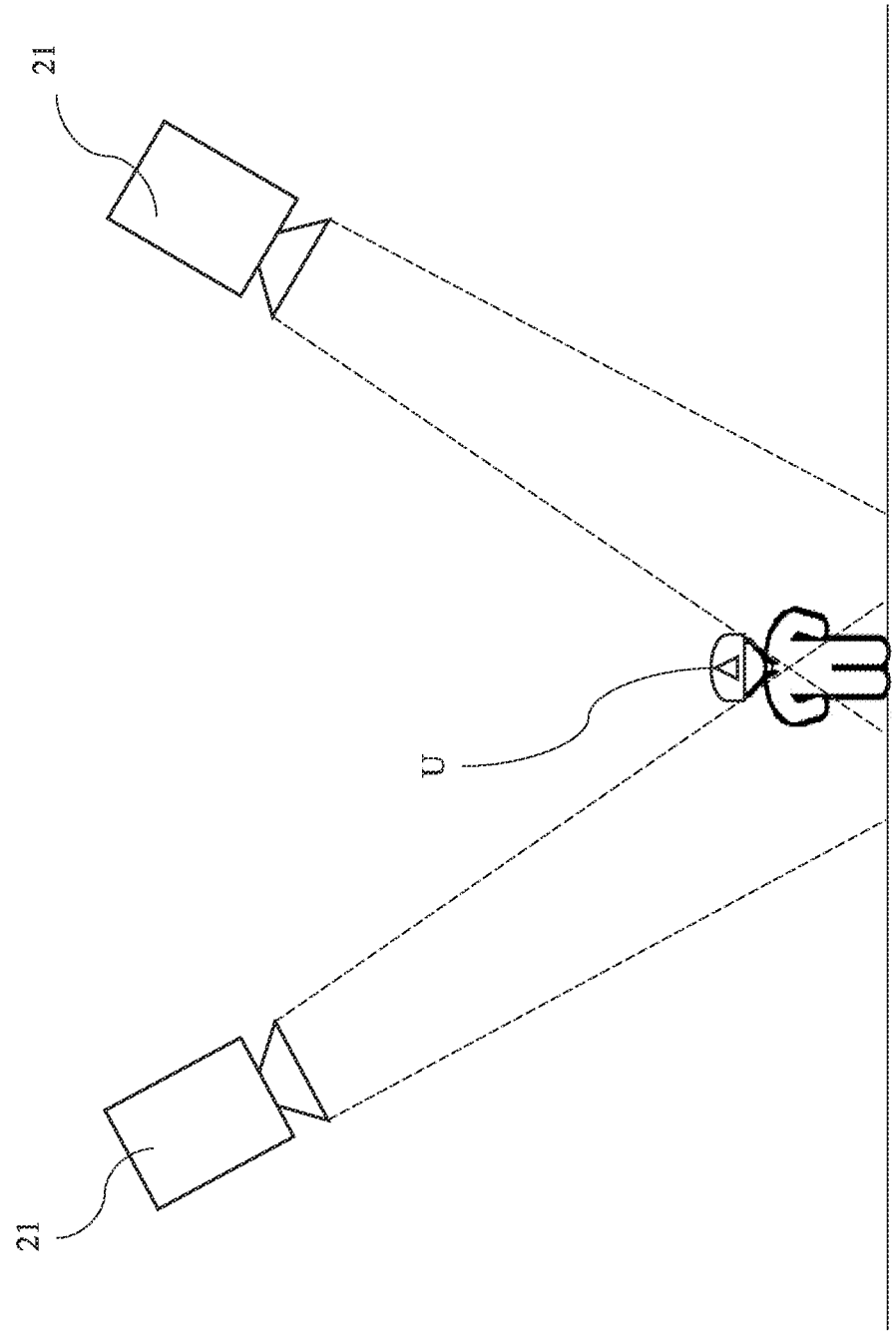
FIG. 11A is a first schematic view of a positioning algorithm of the multi-camera positioning and dispatching system in accordance with the second embodiment of the disclosure.

Please refer to FIG. 11A and FIG. 11B, which are a first schematic view and a second schematic view of a positioning algorithm of the multi-camera positioning and dispatching system in accordance with the second embodiment of the disclosure respectively. As shown in FIG. 11A, the working unit U moves to a specific position of the indoor space S and this position is within the coverages of the images captured by two cameras 21, so the image of each of the two cameras 21 includes the working unit U.

As shown in FIG. 11B, the processing device 22 marks the working unit U in the image of each of the two cameras 21 by a bounding box F and projects the two bounding boxes F to the panoramic map Map. Then, the processing device 22 projects the working unit U to the panoramic map Map according to the central point Md of the overlay J of the two bounding boxes F. In addition, the processing device 22 can determine whether the working unit U in one of the bounding boxes F is the same with the working unit U in the other according to the positions and the moving directions of the working units U in the bounding boxes F.

Similarly, when the images captured by three or more cameras 21 include the same working unit U, the processing device 21 marks the working unit U in the image captured by each of the cameras 21 by a bounding box F and projects the three bounding boxes F to the panoramic map Map. Then, the processing device 22 projects the working unit U to the panoramic map Map according to the central point Md of the overlay J of the three bounding boxes F.

Via the above positioning algorithm, the multi-camera positioning and dispatching system 2 can more precisely position all working units U in the indoor space S, and more appropriately implement task assignment and moving path planning so as to improve the efficiency of the warehouse management and save manpower.

The embodiment just exemplifies the disclosure and is not intended to limit the scope of the disclosure. Any equivalent modification and variation according to the spirit of the disclosure is to be also included within the scope of the following claims and their equivalents.

Figure 12:
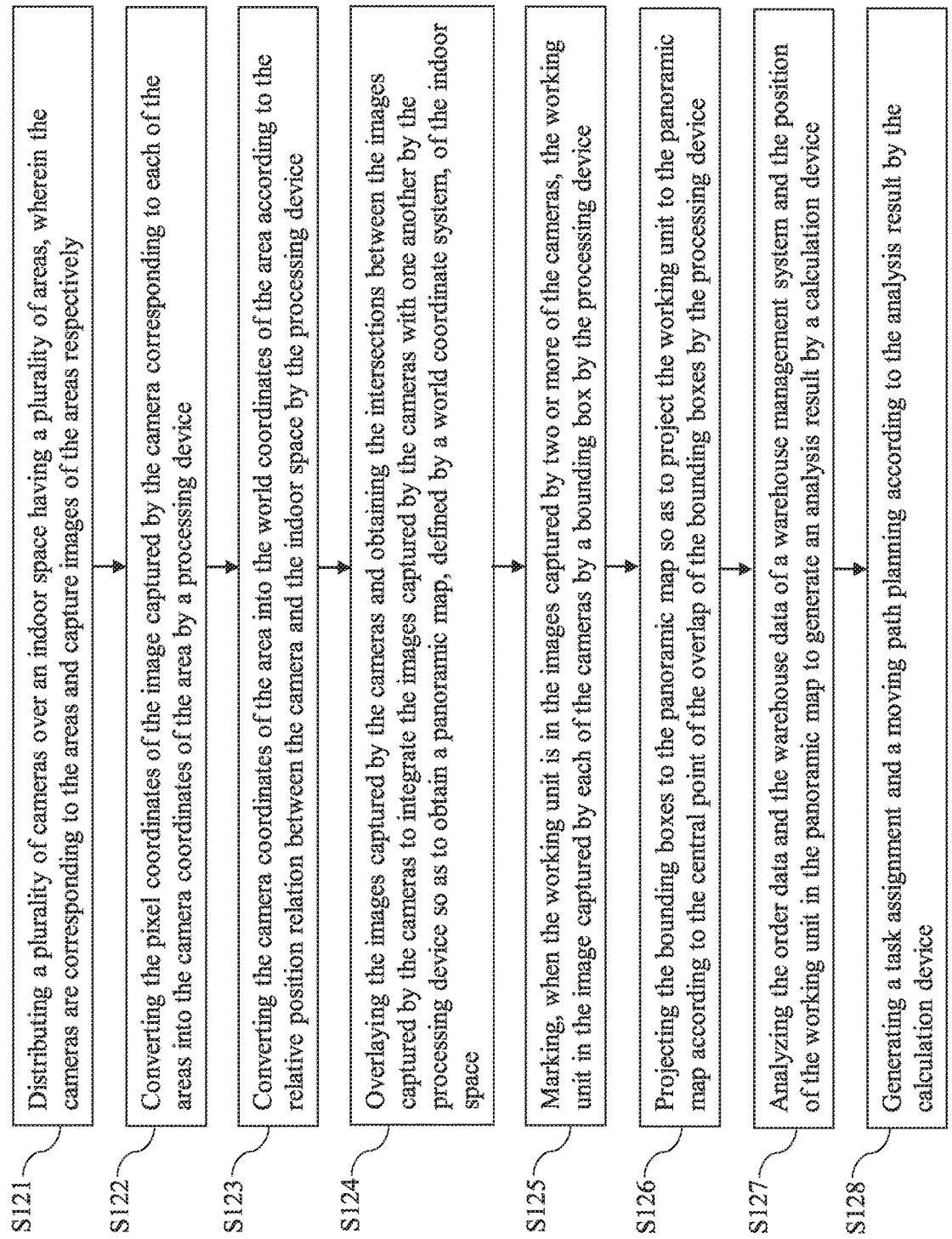
FIG. 12 is a flow chart of a multi-camera positioning and dispatching method in accordance with the second embodiment of the disclosure.

Please refer to FIG. 12, which is a flow chart of a multi-camera positioning and dispatching method in accordance with the second embodiment of the disclosure. The multi-camera positioning and dispatching method adopted by the system 2 of the embodiment includes the following steps:

Step S121: distributing a plurality of cameras over an indoor space having a plurality of areas, wherein the cameras are corresponding to the areas and capture images of the areas respectively.

Step S122: converting the pixel coordinates of the image captured by the camera corresponding to each of the areas into the camera coordinates of the area by a processing device.

Step S123: converting the camera coordinates of the area into the world coordinates of the area according to the relative position relation between the camera and the indoor space by the processing device.

Step S124: overlaying the images captured by the cameras and obtaining the intersections between the images captured by the cameras to integrate the images captured by the cameras with one another by the processing device so as to obtain a panoramic map, defined by a world coordinate system, of the indoor space.

Step S125: marking, when the working unit is in the images captured by two or more of the cameras, the working unit in the image captured by each of the cameras by a bounding box by the processing device.

Step S126: projecting the bounding boxes to the panoramic map so as to project the working unit to the panoramic map according to the central point of the overlap of the bounding boxes by the processing device.

Step S127: analyzing the order data and the warehouse data of a warehouse management system and the position of the working unit in the panoramic map to generate an analysis result by a calculation device.

Step S128: generating a task assignment and a moving path planning according to the analysis result by the calculation device.

To sum up, according to one embodiment of the disclosure, the multi-camera positioning and dispatching system can overlay the images captured by the cameras and obtain the intersections between the images captured by the cameras to integrate the images with one another so as to obtain a panoramic map, defined by a world coordinate system, of the indoor space. Thus, the multi-camera positioning and dispatching system can project a working unit to the panoramic map according to the pixel coordinate of the working unit in the image captured by any one of the cameras, so can effectively position the working units of the indoor space.

In addition, according to one embodiment of the disclosure, the multi-camera positioning and dispatching system can mark a working unit in the image captured by each of the cameras by a bounding box and projects the bounding boxes to the panoramic map so as to project the working unit to the panoramic map according to a central point of the overlap of the bounding boxes. Therefore, the multi-camera positioning and dispatching system can effectively improve the positioning precision thereof.

Moreover, according to one embodiment of the disclosure, the multi-camera positioning and dispatching system can analyze the order data and the warehouse data of a warehouse management system and the positions of the working units in order to generate an analysis result. Then, the multi-camera positioning and dispatching system can generate the task assignment and the moving path planning according to the analysis result. In this way, the multi-camera positioning and dispatching system can average the workloads of the working units (the working units U may be, but not limited to, tally clerks and transportation vehicles, such as automated guided vehicles) and optimize the moving paths thereof with a view to increase the efficiency of the indoor environment and save more manpower.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A multi-camera positioning and dispatching system, comprising:
   a plurality of cameras, distributed over an indoor space having a plurality of areas, wherein the cameras are corresponding to the areas and configured to capture images of the areas respectively, wherein the image captured by any one of the cameras partially overlaps the image captured by another one of the cameras; and
   a processing device, configured to convert pixel coordinates of the image captured by the camera corresponding to each of the areas into camera coordinates of the area, and convert the camera coordinates of the area into world coordinates of the area according to a relative position relation between the camera and the indoor space, whereby the pixel coordinates of the image are converted into the camera coordinates of the area and the camera coordinates of the area are converted into the world coordinates of the area, and overlay the images captured by the cameras and obtain intersections between the images captured by the cameras so as to integrate the images captured by the cameras with one another, whereby the processing device obtains a panoramic map, defined by a world coordinate system, of the indoor space;
   wherein when the image captured by any one of the cameras includes a working unit, the processing device projects the working unit to the panoramic map according to a pixel coordinate of the working unit in the image captured by the camera, wherein when the working unit is in the images captured by two or more of the cameras, the processing device marks the working unit in the image captured by each of the cameras by a bounding box and projects the bounding boxes to the panoramic map so as to project the working unit to the panoramic map according to a central point of an overlap of the bounding boxes.

2. The multi-camera positioning and dispatching system of claim 1, wherein the processing device obtains the relative position relation between each of the cameras and the indoor space according to a feature point of the image captured by the camera.

3. The multi-camera positioning and dispatching system of claim 1, wherein the processing device converts the camera coordinates of each of the areas into the world coordinates of the area according to a rotation parameter and a translation parameter of the camera corresponding to the area.

4. The multi-camera positioning and dispatching system of claim 1, wherein the processing device converts the pixel coordinates of each of the areas into the camera coordinates of the area according to an intrinsic matrix of the camera corresponding to the area.

5. The multi-camera positioning and dispatching system of claim 1, wherein further comprising a calculation device configured to analyze an order data and a warehouse data of a warehouse management system and a position of the working unit in the panoramic map to generate an analysis result in order to generate a task assignment and a moving path planning according to the analysis result.

6. The multi-camera positioning and dispatching system of claim 5, wherein the calculation device executes a deep reinforcement learning algorithm to analyze the order data, the warehouse data and a world coordinate of the working unit in order to generate the analysis result.

7. The multi-camera positioning and dispatching system of claim 5, wherein the calculation device executes a pointer networks algorithm according to the analysis result in order to generate the task assignment and the moving path planning.

8. The multi-camera positioning and dispatching system of claim 1, wherein the working unit is a tally clerk or a transportation vehicle.

9. The multi-camera positioning and dispatching system of claim 1, wherein the processing device performs an image recognition deep learning algorithm to recognize the working unit via a convolutional neural network.

10. A multi-camera positioning and dispatching method, comprising:
   distributing a plurality of cameras over an indoor space having a plurality of areas, wherein the cameras are corresponding to the areas and configured to capture images of the areas respectively, wherein the image captured by any one of the cameras partially overlaps the image captured by another one of the cameras;
   converting pixel coordinates of the image captured by the camera corresponding to each of the areas into camera coordinates of the area by a processing device;
   converting the camera coordinates of the area into world coordinates of the area according to a relative position relation between the camera and the indoor space by the processing device, whereby the pixel coordinates of the image are converted into the camera coordinates of the area and the camera coordinates of the area are converted into the world coordinates of the area;
   overlaying the images captured by the cameras and obtaining intersections between the images captured by the cameras to integrate the images captured by the cameras with one another by the processing device so as to obtain a panoramic map, defined by a world coordinate system, of the indoor space; and
   projecting, when the image captured by any one of the cameras includes a working unit, the working unit to the panoramic map according to a pixel coordinate of the working unit in the image captured by the camera by the processing device;
   marking, when the working unit is in the images captured by two or more of the cameras, the working unit in the image captured by each of the cameras by a bounding box by the processing device; and
   projecting the bounding boxes to the panoramic map so as to project the working unit to the panoramic map according to a central point of an overlap of the bounding boxes by the processing device.

11. The multi-camera positioning and dispatching method of claim 10, wherein a step of converting the camera coordinates of the area into the world coordinates of the area according to the relative position relation between the camera and the indoor space by the processing device further comprising:
   obtaining the relative position relation between each of the cameras and the indoor space according to a feature point of the image captured by the camera by the processing device.

12. The multi-camera positioning and dispatching method of claim 10, wherein a step of converting the camera coordinates of the area into the world coordinates of the area according to the relative position relation between the camera and the indoor space by the processing device further comprising:
   converting the camera coordinates of each of the areas into the world coordinates of the area according to a rotation parameter and a translation parameter of the camera corresponding to the area by the processing device.

13. The multi-camera positioning and dispatching method of claim 10, wherein a step of converting pixel coordinates of the image captured by the camera corresponding to each of the areas into camera coordinates of the area by the processing device further comprising:
   converting the pixel coordinates of each of the areas into the camera coordinates of the area according to an intrinsic matrix of the camera corresponding to the area by the processing device.

14. The multi-camera positioning and dispatching method of claim 10, further comprising:
   analyzing an order data and a warehouse data of a warehouse management system and a position of the working unit in the panoramic map to generate an analysis result by a calculation device; and
   generating a task assignment and a moving path planning according to the analysis result by the calculation device.

15. The multi-camera positioning and dispatching method of claim 14, wherein a step of analyzing the order data and the warehouse data of the warehouse management system and the position of the working unit in the panoramic map to generate the analysis result by the calculation device further comprising:
   executing a deep reinforcement learning algorithm to analyze the order data, the warehouse data and a world coordinate of the working unit by the calculation device in order to generate the analysis result.

16. The multi-camera positioning and dispatching method of claim 14, wherein a step of generating the task assignment and the moving path planning according to the analysis result by the calculation device further comprising:
   executing a pointer networks algorithm according to the analysis result by the calculation device in order to generate the task assignment and the moving path planning.

17. The multi-camera positioning and dispatching method of claim 10, further comprising:
   performing an image recognition deep learning algorithm to recognize the working unit via a convolutional neural network by the processing device.

* * * * *